(12) United States Patent
Park et al.

(10) Patent No.: US 12,580,594 B2
(45) Date of Patent: Mar. 17, 2026

(54) METHOD AND APPARATUS FOR DETECTING REFLECTION COEFFICIENT

(71) Applicants: Samsung Electronics Co., Ltd., Suwon-si (KR); POSTECH RESEARCH AND BUSINESS DEVELOPMENT FOUNDATION, Pohang-si (KR)

(72) Inventors: Hyunchul Park, Suwon-si (KR); Ho-Jin Song, Pohang-si (KR); Yonghoon Kim, Suwon-si (KR); Sunggi Yang, Suwon-si (KR); Seunguk Choi, Pohang-si (KR); Seunghoon Lee, Pohang-si (KR)

(73) Assignees: Samsung Electronics Co., Ltd., Suwon-si (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 294 days.

(21) Appl. No.: 18/355,021

(22) Filed: Jul. 19, 2023

(65) Prior Publication Data

US 2023/0370096 A1 Nov. 16, 2023

Related U.S. Application Data

(63) Continuation of application No. PCT/KR2022/000974, filed on Jan. 19, 2022.

(30) Foreign Application Priority Data

Jan. 20, 2021 (KR) ........................ 10-2021-0008348

(51) Int. Cl.
| | |
|---|---|
| *H04B 1/00* | (2006.01) |
| *H04B 1/04* | (2006.01) |
| *H04B 1/18* | (2006.01) |

(52) U.S. Cl.
CPC ......... *H04B 1/0007* (2013.01); *H04B 1/0458* (2013.01); *H04B 1/18* (2013.01)

(58) Field of Classification Search
CPC ...... H04B 1/0007; H04B 1/0458; H04B 1/18; H04B 3/46; G01R 27/06; G01R 23/06;
(Continued)

(56) References Cited

U.S. PATENT DOCUMENTS

| | | | |
|---|---|---|---|
| 5,038,146 A | 8/1991 | Troychak et al. | |
| 7,711,337 B2 * | 5/2010 | Mckinzie, III | ........... H03H 7/40 |
| | | | 455/248.1 |

(Continued)

FOREIGN PATENT DOCUMENTS

| | | |
|---|---|---|
| CN | 102324990 A | 1/2012 |
| CN | 105098308 A | 11/2015 |

(Continued)

OTHER PUBLICATIONS

Extended European Search Report dated May 15, 2024, issued in European Patent Application No. 22742821.6.
(Continued)

*Primary Examiner* — Davetta W Goins
(74) *Attorney, Agent, or Firm* — Jefferson IP Law, LLP

(57) ABSTRACT

The disclosure relates to a 5$^{th}$ generation (5G) or pre-5G communication system for supporting a higher data transmission rate than a 4$^{th}$ generation (4G) communication system, such as long term evolution (LTE). A circuit for detecting a reflection coefficient of an electronic device in a wireless communication system is provided. The circuit includes at least one processor, a plurality of analog to digital converters (ADCs), a plurality of RF elements, and a plurality of transmission lines including a first transmission line, a second transmission line, and a third transmission line, wherein the plurality of ADCs, the plurality of RF
(Continued)

elements, and the plurality of transmission lines are correspondingly connected to each other, respectively, the plurality of ADCs are connected to the at least one processor.

18 Claims, 8 Drawing Sheets

(58) Field of Classification Search
CPC ............ G01R 19/0038; G01R 19/0084; G01R 19/2503; G01R 23/005; G01R 23/165
See application file for complete search history.

(56) References Cited

U.S. PATENT DOCUMENTS

| | | | |
|---|---|---|---|
| 9,140,733 B2 | 9/2015 | Schmidhammer et al. | |
| 9,594,147 B2 | 3/2017 | Han et al. | |
| 9,762,416 B2 * | 9/2017 | Mandegaran | H01Q 9/0442 |
| 10,075,202 B2 | 9/2018 | Wu et al. | |
| 10,447,263 B2 | 10/2019 | Yang et al. | |
| 10,473,719 B2 | 11/2019 | Horikami et al. | |
| 10,727,958 B2 | 7/2020 | Kim et al. | |
| 11,641,243 B2 | 5/2023 | Song et al. | |
| 2007/0197180 A1 | 8/2007 | McKinzie, III et al. | |
| 2010/0225301 A1 | 9/2010 | Nakayama et al. | |
| 2017/0093441 A1 * | 3/2017 | Mandegaran | H04B 1/0458 |
| 2020/0169331 A1 | 5/2020 | Kim et al. | |
| 2022/0294542 A1 | 9/2022 | Song et al. | |

FOREIGN PATENT DOCUMENTS

| | | | | |
|---|---|---|---|---|
| EP | 1542026 A1 * | 6/2005 | | G01R 27/06 |
| JP | 2019-211314 A | 12/2019 | | |
| KR | 10-0999710 B1 | 12/2010 | | |
| KR | 10-1169404 B1 | 8/2012 | | |
| KR | 10-2014-0075959 A | 6/2014 | | |
| KR | 10-2021-0017533 A | 2/2021 | | |
| KR | 10-2021-0017540 A | 2/2021 | | |
| KR | 10-2231753 B1 | 3/2021 | | |
| KR | 10-2021-0067669 A | 6/2021 | | |

OTHER PUBLICATIONS

A phased array RFIC with built-in self-test capabilities; IEEE Transactions on Microwave Theory and Techniques, vol. 60, No. 1, Jan. 2012.

International Search Report dated May 16, 2022, issued in an International Application No. PCT/KR2022/00097 4.

Korean Office Action dated May 7, 2025, issued in Korean Application No. 10-2021-0008348.

Korean Notice of patent Grant dated Sep. 5, 2025, issued in a Korean Application No. 10-2021-0008348.

* cited by examiner $$
320 \begin{cases} 321 \\ 322 \\ 323 \end{cases}
$$

$$
330 \begin{cases} 331 \\ 332 \\ 333 \end{cases}
$$

○ : 701
● : 703

METHOD AND APPARATUS FOR DETECTING REFLECTION COEFFICIENT

CROSS-REFERENCE TO RELATED APPLICATION(S)

This application is a continuation application, claiming priority under § 365(c), of an International application No. PCT/KR2022/000974, filed on Jan. 19, 2022, which is based on and claims the benefit of a Korean patent application number 10-2021-0008348, filed on Jan. 20, 2021, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) POSTECH RESEARCH AND BUSINESS DEVELOPMENT FOUNDATION.

BACKGROUND

1. Field

The disclosure relates to a wireless communication system. ore particularly, the disclosure relates to a method and an apparatus for detecting a reflection coefficient in a wireless communication system.

2. Description of the Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency millimeter wave (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) frequency and quadrature amplitude Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In an electronic device configured to transmit/receive a signal of a wireless communication system, a reflection coefficient of a signal transmitted to or received from the electronic device needs to be measured in order to observe characteristics of circuits disposed in the electronic device. The electronic device may transmit or receive a target signal by performing self-diagnosis or self-correction based on the measured reflection coefficient.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for detecting a reflection coefficient of a transmission/reception signal by measuring a plurality of voltage values for a signal in a wireless communication system.

Another aspect of the disclosure is to provide an apparatus and a method for detecting a reflection coefficient of a transmission/reception signal based on the magnitude of voltage values measured in a wireless communication system.

Another aspect of the disclosure is to provide an apparatus and a method for detecting a reflection coefficient of a transmitted/received signal through a more compact structure in a wireless communication system.

Additional aspects will be set forth in part in the description which follows and, in part, will be apparent from the description, or may be learned by practice of the presented embodiments.

In accordance with an aspect of the disclosure, a circuit for detecting a reflection coefficient of an electronic device in a wireless communication system is provided. The circuit includes at least one processor, a plurality of analog to digital converters (ADCs), a plurality of radio frequency (RF) elements, and a plurality of transmission lines including a first transmission line, a second transmission line, and a third transmission line, wherein the plurality of ADCs, the plurality of RF elements, and the plurality of transmission lines are correspondingly connected to each other, respectively, the plurality of ADCs are connected to the at least one processor, the first transmission line is disposed to be spaced apart from a transmission line of the electronic device by a predetermined distance and is electrically connected at a first point of the transmission line, the second transmission line is disposed to be spaced apart from the transmission line by a predetermined distance and is electrically connected at a second point of the transmission line, the third transmission line is disposed to be spaced apart from the transmission line by a predetermined distance and is electrically connected at a third point of the transmission line, the first point may be spaced apart from the second point by a first length, and the third point may be spaced apart from the second point by a second length.

In accordance with another aspect of the disclosure, a method for detecting a reflection coefficient of an electronic device in a wireless communication system is provided. The method includes obtaining, for a signal passing through a transmission line of the electronic device, voltages of the signal with respect to a plurality of points on the transmission line, extracting the magnitude of measured voltages of the signal, and calculating a reflection coefficient of the signal based on the extracted magnitude of voltages of the signal and information on the plurality of points.

In accordance with another aspect of the disclosure, a circuit for detecting a reflection coefficient of an electronic device in a wireless communication system is provided. The circuit includes a plurality of couplers including a plurality of transmission lines electrically connected to a transmission line of the electronic device at a plurality of points, a plurality of RF elements connected to the plurality of couplers, a plurality of analog to digital converters (ADCs) connected to the plurality of RF elements, and at least one processor connected to the plurality of ADCs, wherein the at least one processor is configured to calculate a reflection coefficient of a signal passing through the transmission line of the electronic device based on the magnitude of voltages of the signal and information on the plurality of points, wherein the magnitude of the voltages of the signal is extracted by the plurality of RF elements based on voltages of the signal, obtained on the plurality of points by the plurality of couplers.

An apparatus and a method according to various embodiments of the disclosure may achieve miniaturization of a structure for detecting a reflection coefficient by measuring a plurality of voltage values for a signal transmitted to or received from an electronic device.

An apparatus and a method according to various embodiments of the disclosure may achieve simplification and miniaturization of an integrated circuit structure by using only the magnitude of measured voltage values for a signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numerals are used to depict the same or similar elements, features, and structures.

DETAILED DESCRIPTION

Figure 1:
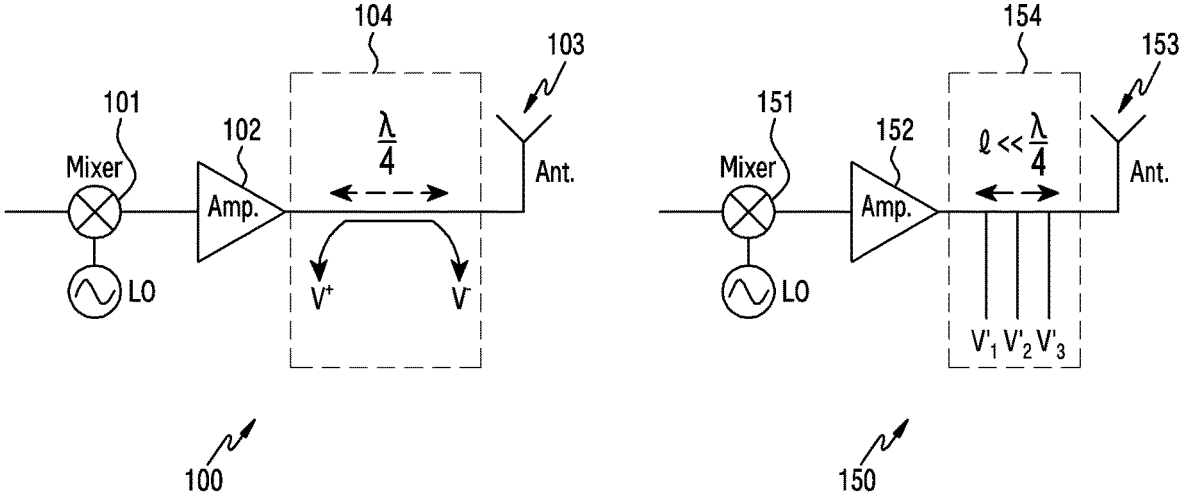
FIG. 1 illustrates an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in this disclosure are used to describe specific embodiments only and are not intended to limit the scope of other embodiments. Singular expressions may include plural expressions unless the context clearly indicates otherwise. Terms used herein, including technical or scientific terms, are intended to have the same meaning as commonly understood by one of ordinary skill in the art described in this disclosure. Terms used in this disclosure that have common dictionary definitions are intended to have the same or similar meanings as they have in the context of the relevant art and are not intended to be interpreted in an idealized or overly formal sense unless expressly defined in this disclosure. In some cases, terms defined in this disclosure should not be construed to exclude embodiments of this disclosure.

The various embodiments of the disclosure described below describe hardware approaches as examples. However, various embodiments of the disclosure include techniques that utilize both hardware and software, and therefore, various embodiments of the disclosure are not intended to exclude software-based approaches.

As used in the following description, terms referring to parts of an electronic device (e.g., circuits, processors, chips, integrated circuits, components, elements), terms referring to the geometry of the parts (e.g., contacts), terms referring to connections between structures (e.g.: transmission line, coupled transmission line, main transmission line, connection line, feeding line, connection, contact), terms referring to circuits (e.g., transmission line, coupled transmission line, main transmission line, integrated circuit, signal line, feeding line, RF signal line, antenna line, RF path, RF module, RF circuit, RF device), and the like are exemplified for ease of explanation. Accordingly, the disclosure is not limited to these terms, and other terms having equivalent technical meaning may be used. In addition, the terms " . . .

unit," " . . . er," " . . . part," " . . . body," and the like, as used herein, may refer to at least one geometric structure or a unit for processing a function.

In an electronic device of a wireless communication system, the electronic device may transmit or receive a signal. In this case, characteristics of circuits disposed in the electronic device may be observed by detecting a reflection coefficient of a transmitted/received signal. Accordingly, the electronic device may transmit/receive a target signal by performing self-diagnosis or self-correction by using information on the detected reflection coefficient. As a structure for detecting the reflection coefficient, a directional coupler and a detector may be used.

Specifically, by arranging a coupled-line coupler in an area adjacent to a transmission line through which a signal passes, the signal is separated into forward and backward signals and extracted, and by detecting the magnitude and phase of the extracted forward and the backward signals through the detector, a reflection coefficient may be detected. However, such a coupled-line coupler requires a specific length corresponding to $\lambda/4$ length. Here, $\lambda$ implies the wavelength of a signal passing through a transmission line. Since such a coupler is disposed inside an integrated circuit of an electronic device, the size of the integrated circuit increases.

Hereinafter, the disclosure proposes an apparatus and a method for detecting a reflection coefficient through a more miniaturized structure in order to address the above-described issues. In the disclosure, a reflection coefficient may be detected through a small-sized reflection coefficient detection circuit (hereinafter, referred to as a small reflection coefficient detection circuit), which is required to implement a self-diagnosis or self-correction function in an integrated circuit of an electronic device. Specifically, an existing reflection coefficient detection circuit additionally disposes a transmission line of a specific length (e.g., $\lambda/4$) in an area adjacent to a transmission line through which a signal to be extracted passes, and extracts forward and backward signals from two points of the additionally disposed transmission line so as to detect a reflection coefficient. Alternatively, the small reflection coefficient detection circuit according to an embodiment of the disclosure may detect the reflection coefficient by obtaining voltages of the signal from three contacts on the transmission line through which a signal to be extracted passes. More particularly, the total length of the three contacts is configured to be shorter than a transmission line of a specific length required by the existing reflection coefficient detection circuit. In addition, the small reflection coefficient detection circuit according to an embodiment of the disclosure may detect the reflection coefficient by using only information on the magnitude of the extracted signal (e.g., the magnitude of the voltage). Accordingly, the reflection coefficient detection circuit of the electronic device may be implemented with a size smaller than that of the existing reflection coefficient detection circuit structure, and thus the electronic device or the integrated circuit including the reflection coefficient detection circuit of this structure may realize miniaturization.

FIG. 1 illustrates an electronic device according to an embodiment of the disclosure.

Referring to FIG. 1, the figure on the left side of FIG. 1 shows a part of an electronic device 100 including a directional coupler, for explaining an electronic device 150 according to an embodiment of the disclosure, and the figure on the right side of FIG. 1 shows a part of the electronic device 150 including a small reflection coefficient detection circuit according to an embodiment of the disclosure.

Referring to FIG. 1, a directional coupler of the electronic device 100 and a small reflection coefficient detection circuit of the electronic device 150 are each electrically connected to a transmission line connecting an amplifier (power amplifier) and an antenna between the power amplifier and the antenna. However, this is only for convenience of explanation, and the disclosure is not limited thereto. For example, the small reflection coefficient detection circuit of the electronic device 150 may be electrically connected to a transmission line between a mixer and a power amplifier.

Referring to the figure on the right side of FIG. 1, the electronic device 100 may include a mixer, a local oscillator 101, a power amplifier 102, an antenna 103, and a directional coupler 104.

According to an embodiment of the disclosure, the directional coupler 104 may be disposed between the power amplifier 102 and the antenna 103. Specifically, the directional coupler 104 may be disposed to be spaced apart from a transmission line, which is connecting between the power amplifier 102 and the antenna 103, by a predetermined distance. According to an embodiment of the disclosure, the directional coupler 104 may include a transmission line having a specific length. For example, when the wavelength of a signal passing through the transmission line connecting between the power amplifier 102 and the antenna 103 is $\lambda$, the length of the transmission line configuring the directional coupler 104 may be $\lambda/4$. According to an embodiment of the disclosure, the directional coupler 104 is disposed in an area adjacent to the transmission line connecting between the power amplifier 102 and the antenna 103, and thus the signal passing through the transmission line may be separated into forward and backward signals.

According to an embodiment of the disclosure, a detector (not shown) connected to the directional coupler 104 may extract information on the magnitude and phase of the separated forward and backward signals. Here, the detector may refer to an in-phase quadrature (I/Q) detector. The I/Q detector may include mixers, low pass filters (LPFs), local oscillators, and a coupler configured to establish a phase difference of 90°. Based on the magnitude and phase information of the forward signal and the backward signal extracted by the detector, the electronic device 100 may detect a reflection coefficient of the signal.

Alternatively, referring to the figure on the right side of FIG. 1, the electronic device 150 may include a mixer, a local oscillator 151, a power amplifier 152, an antenna 153, and a reflection coefficient detection circuit 154. According to an embodiment of the disclosure, the reflection coefficient detection circuit 154 may be disposed between the power amplifier 152 and the antenna 153. Specifically, the reflection coefficient detection circuit 154 may be electrically connected to a transmission line connecting between the power amplifier 152 and the antenna 153 at predetermined three contacts. For example, the reflection coefficient detection circuit 154 may be electrically connected to a transmission line connecting between the power amplifier 152 and the antenna 153 through a first contact, a second contact, and a third contact. According to an embodiment of the disclosure, a length between the first to third contacts of the reflection coefficient detection circuit 154 may be configured to be shorter than a specific length. Here, when the wavelength of a signal transmitted to or received from the electronic device 150 is $\lambda$, the specific length may imply $\lambda/4$.

According to an embodiment of the disclosure, the reflection coefficient detection circuit 154 may acquire information about a signal, which is passing through a transmission line connecting between the power amplifier 152 and the antenna 153, at the first contact, the second contact, and the third contact, respectively. Here, acquisition may be understood to have the same meaning as that of extraction, detection, measurement, and sensing.

The electronic device 100 additionally arranges a directional detector 104 to perform reflection coefficient detection, and acquires signal information from both ends of the directional detector 104. However, the reflection coefficient detection circuit 154 of the electronic device 150 acquires signal information from three contacts and detects a reflection coefficient, and thus there is no need to additionally dispose a transmission line having a specific length (e.g., $\lambda/4$). In addition, the reflection coefficient detection circuit 154 of the electronic device 150 may acquire information about the signal within a range narrower than that of the directionality detector 104 of the electronic device 100. In other words, the electronic device 150 may include a reflection coefficient detection circuit having a size smaller than that of the electronic device 100, and may detect the reflection coefficient through the reflection coefficient detection circuit. Hereinafter, a configuration of the reflection coefficient detection circuit 154 of the electronic device 150 and a reflection coefficient detection process will be described.

Figure 2:
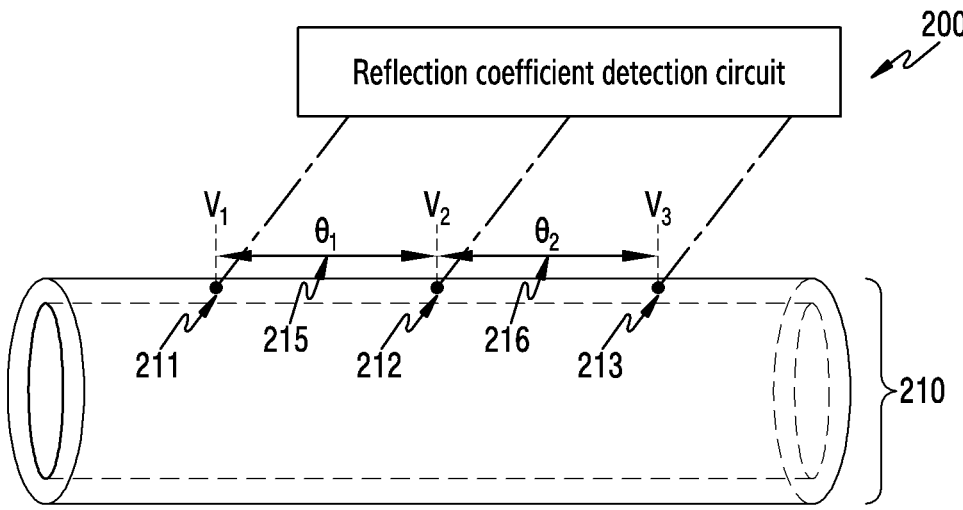
FIG. 2 illustrates information of a signal for detecting a reflection coefficient according to an embodiment of the disclosure.

FIG. 2 illustrates information of a signal for detecting a reflection coefficient according to an embodiment of the disclosure. FIG. 2 shows a transmission line for a region to which the reflection coefficient detection circuit 154 of the electronic device 150 of FIG. 1 is electrically connected. The transmission line may imply a path through which a signal transmitted to or received from the electronic device travels. FIG. 2 illustrates that the transmission line has the shape of a hollow cylinder to describe the embodiments of the disclosure, but this shape is not construed as limiting embodiments of the disclosure.

Referring to FIG. 2, a reflection coefficient detection circuit 200 may be electrically connected to a transmission line 210 at three contacts. For example, the reflection coefficient detection circuit 200 may be connected to the transmission line 210 through a first contact 211, a second contact 212, and a third contact 213. According to an embodiment of the disclosure, the reflection coefficient detection circuit 200 may acquire voltages of a signal passing through each of the contacts. For example, couplers of the reflection coefficient detection circuit 200 electrically connected to the transmission line 210, which will be described later, may acquire a voltage $(V_1)$ of the signal at the first contact 211, a voltage $(V_2)$ of the signal at the second contact 212, and a voltage $(V_3)$ of the signal at the third contact 213.

According to an embodiment of the disclosure, the length between the first contact 211 and the second contact 212 may correspond to a first length 215 $(\theta_1)$, and the length between the second contact 212 and the third contact 213 may correspond to a second length 216 $(\theta_2)$. Here, the first length 215 and the second length 216 may imply an electrical length or a physical length. For example, the electrical lengths of the first length 215 and the second length 216 may imply a phase difference between signals. For another example, the physical lengths of the first length 215 and the second length 216 may imply the length of the transmission line 210. According to an embodiment of the disclosure, the sum of the first length 215 and the second length 216 may be configured to be shorter than a specific length. Here, the specific length may be $\lambda/4$ when the wavelength of the signal passing through the transmission line 210 is A. For example, the sum of the first length 215 and the second length 216 may be configured to be shorter than $\lambda/4$. For example, the sum of the first length 215 and the second length 216 may be configured to have a length of $\lambda/10$ or $\lambda/20$. However, the above-described sum of the first length 215 and the second length 216 is merely an example for convenience of explanation, and the disclosure is not limited thereto. In addition, the lengths of the first length 215 and the second length 216 may be the same or different from each other. This may imply that the distance from the second contact 212 to the first contact 211 and the distance from the second contact 212 to the third contact 213 may be configured to be the same or different. According to an embodiment of the disclosure, the first length 215 and the second length 216 may be determined during design. For example, the first length 215 and the second length 216 may not be values that change as a signal characteristic (e.g., frequency and the like) is changed, and may be determined when the electronic device is designed.

As described above, in FIG. 2, the reflection coefficient detection circuit may be connected to predetermined three points (e.g., the first contact, the second contact, and the third contact) of the transmission line, which is disposed inside the electronic device and through which a signal passes, and may acquire the voltage of the signal passing through the transmission line at each point. In addition, the length between points is a value that is already determined and known when the electronic device is designed, and the reflection coefficient of the signal transmitted to or received from the electronic device may be detected through the obtained signal voltage and the length between points. Hereinafter, the configuration of the reflection coefficient detection circuit and the process of detecting the reflection coefficient as described above will be described.

Figure 3:
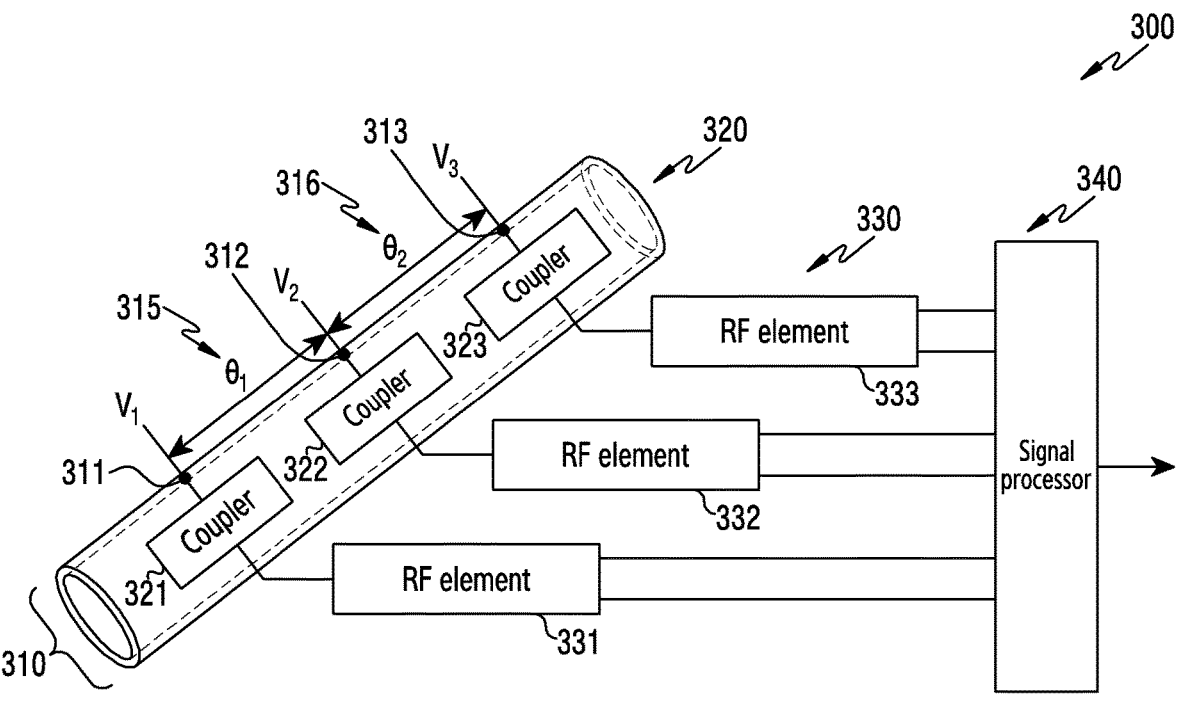
FIG. 3 illustrates a structure of a reflection coefficient detection circuit according to an embodiment of the disclosure.

FIG. 3 illustrates a structure of a reflection coefficient detection circuit according to an embodiment of the disclosure. A transmission line may imply a path through which a signal transmitted to or received from the electronic device travels. FIG. 3 illustrates that the transmission line has the shape of a hollow cylinder to describe the embodiments of the disclosure, but this shape is not to be construed as limiting the embodiments of the disclosure.

Referring to FIG. 3, $V_1$ may imply a voltage of a signal at a first contact, $V_2$ may imply a voltage of a signal at a second contact, and $V_3$ may imply a voltage of a signal at a third contact. In addition, $\theta_1$ may indicate a first length between the first contact and the second contact, and $\theta_2$ may indicate a second length between the second contact and the third contact.

Referring to FIG. 3, a reflection coefficient detection circuit 300 may include a coupler 320, an RF element 330, and a signal processor 340. According to an embodiment of the disclosure, the coupler 320 may be disposed between an RF element 330 and a transmission line 310 in the electronic device. In this case, the coupler 320 may include a plurality of couplers (e.g., a first coupler 321, a second coupler 322, and a third coupler 323). Here, the transmission line 310 may be referred to as a main transmission line. In addition, the RF element 330 may be disposed between the coupler 330 and the signal processor 340. In this case, the RF element 330 may include a plurality of RF elements (e.g., a first RF element 331, a second RF element 332, and a third RF element 333). According to an embodiment of the disclosure, a plurality of couplers may be connected to a plurality of RF elements in a one-to-one basis. For example, the first coupler 321 may be connected to the first RF element 331. For another example, the second coupler 322 may be connected to the second RF element 332. For another example, the third coupler 323 may be connected to the third RF element 333. According to an embodiment of the disclosure, the signal processor 340 may be connected to the RF elements 330. In other words, the first RF element 331, the second RF element 332, and the third RF element 333 may be connected to the signal processor 340.

According to an embodiment of the disclosure, the couplers 320 may be connected to the transmission line 310 at three contacts. For example, the first coupler 321 may be electrically connected to the first contact 311, the second coupler 322 may be electrically connected to the second contact 312, and the third coupler 323 may be electrically connected to the third contact 313. In addition, the second coupler 322 may be spaced apart from the first coupler 321 by a first length 315 and may be spaced apart from the third coupler 323 by a second length 316. According to an embodiment of the disclosure, the first length 315 may be formed to be the same as the second length 316. According to another embodiment of the disclosure, the first length 315 may be formed to be different from the second length 316. According to an embodiment of the disclosure, the distance between the contacts may be formed to be the same as the distance between the couplers 320. However, this is only an example for convenience of explanation, and the disclosure is not limited thereto. The couplers may not be spaced apart by the same interval as that between the contacts. According to an embodiment of the disclosure, the coupler 320 may be connected to the RF element 330. For example, the coupler 320 may be connected to the RF element 330 in a one-to-one basis.

According to an embodiment of the disclosure, the coupler 320 may include a transmission line. Here, the transmission line included in the coupler 320 may be referred to as a coupled transmission line. For example, the first coupler 321 may be configured by a coupled transmission line, the second coupler 322 may be configured by a coupled transmission line, and the third coupler 323 may be configured by a coupled transmission line. In addition, the coupler 320 may be disposed to be spaced apart from the transmission line 310 by a predetermined distance, and thus may be electrically connected thereto. For example, the first coupler 321 may be disposed to be spaced apart from the transmission line 310 by a predetermined distance, the second coupler 322 may be disposed to be spaced apart from the transmission line 310 by a predetermined distance, and the third coupler 323 may be disposed to be spaced apart from the transmission line 310 by a predetermined distance. The coupler 320 is electrically connected to the transmission line 310 while being disposed to be spaced apart from the transmission line 310, and thus may be connected to the transmission line 310 by coupling. Accordingly, the coupler 320 may be configured by an element having an impedance component. For example, the coupler 320 may be configured by a capacitive coupler. According to another embodiment of the disclosure, the coupler 320 may be configured by a resistive coupler. For example, the coupler 620 may include a resistor, and the coupler 320 may be connected to the transmission line 310 through a resistor.

According to an embodiment of the disclosure, the coupler 320 may acquire information about a signal of the transmission line 310. For example, the first coupler 321 may acquire a voltage ($V_1$) of the signal at the first contact 311 of the transmission line 310. As another example, the second coupler 322 may acquire a voltage ($V_2$) of the signal at the second contact 312 of the transmission line 310. As still another example, the third coupler 323 may acquire a voltage ($V_3$) of the signal at the third contact 313 of the transmission line 310. Here, acquisition may be understood to have the same meaning as that of extraction, detection, measurement, and sensing. In addition, the coupler 320 may transmit information (e.g., voltage) about a signal acquired at the contacts to the RF elements 330.

According to an embodiment of the disclosure, the RF element 330 may be connected to the coupler 320. For example, the RF element 330 may be connected to the coupler 320 in a one-to-one basis. Specifically, the first RF element 331 may be connected to the first coupler 321, the second RF element 332 may be connected to the second coupler 322, and the third RF element 333 may be connected to the third coupler 323. In addition, the RF element 330 may be connected to the signal processor 340. In this case, each of the first RF element 331, the second RF element 332, and the third RF element 333 may be connected to the signal processor 340. However, the disclosure is not limited thereto, and the first RF element 331, the second RF element 332, and the third RF element 333 are integrated as one and connected to an element, such as a mixer, configured to perform signal processing, and then the integrated one may be connected to the signal processor 340.

According to an embodiment of the disclosure, the RF element 330 may include elements for measuring the magnitude of a signal received from the coupler 320. For example, when a signal envelope detection method is used as a method for measuring the magnitude of the signal received from the coupler 320, the RF element 330 may include a non-linear element (e.g., a diode) to measure the magnitude of the signal, and may include an analog to digital converter (ADC) configured to read values located in the envelope of the signal processed by the non-linear element.

According to an embodiment of the disclosure, the RF element 330 may extract the magnitude of the signal using information about the signal received from the coupler 320. As described above, various methods may be used to extract the magnitude of the signal, and the RF element 330 may include various configurations. For example, when a signal envelope detection method is used, the RF element 330 may include a non-linear element. The RF element may output a current having a value proportional to the square of a voltage value of a signal applied to the non-linear element (e.g., a diode). In case that the current flows through a node, a voltage proportional to the square of the voltage value of the signal may be applied to the node, and this applied voltage may be proportional to the magnitude of the signal. In addition, the RF element 330 may include an analog to digital converter (ADC) to extract information on the magnitude of the signal.

According to an embodiment of the disclosure, the signal processor 340 may be connected to the RF elements 330. For example, the signal processor 340 may be individually connected to each of the RF elements 330. In other words, the signal processor 340 may be individually connected to the first RF element 331, the second RF element 332, and the third RF element 333. As another example, the signal processor 340 may be connected to all of the RF elements 330 by one transmission line. Specifically, the first RF element 331, the second RF element 332, and the third RF element 333 may be integrated by a connector such as one mixer, and may be connected to the signal processor 340 by a transmission line through which the integrated signal passes.

According to an embodiment of the disclosure, the signal processor 340 may detect a reflection coefficient based on the magnitude of the signal processed by the RF elements 330. A process in which the reflection coefficient is detected by the signal processor 340 will be described below. For convenience of explanation, two assumptions for detecting the reflection coefficient may be required. First, it is assumed that transmission lines through which signals are transmitted are lossless transmission lines. In addition, when a transmission line (e.g., the transmission line 310 of FIG. 3) through which a signal is being transferred for the purpose of transmission/reception is referred to as a main transmission line, it is assumed that there is no difference between a forward signal component and a backward signal component on the coupler (e.g., the second coupler 322) in the main transmission line. In order to satisfy such an assumption, when the frequency of a signal passing through the main transmission line is 30 giga hertz (GHz) to 300 GHz, a capacitance from 0.001 femto farad (fF) to several fF may be required. By adjusting a capacitance by coupling by adjusting an interval between the main transmission line and the coupler, the loading by the transmission line (or the coupled transmission line) of the coupler is minimized, so that the above assumption may be applied. When the above two assumptions are applied, the following equations may be used.

As described above, when a transmission line (e.g., the transmission line 310 of FIG. 3) through which a transmitted/received signal passes is referred to as a main transmission line, the couplers 320 of the reflection coefficient detection circuit may be electrically connected at predetermined three points (e.g., the first contact 311, the second contact 312, and the third contact 313) on the main transmission line. The couplers 321, 322, and 323 may acquire a voltage value of a signal passing through the main transmission line at the contacts 311, 312, and 313, respectively. The acquired voltage value of the signal may be expressed as the sum of each directional signal component in a steady-state. When the voltages of the contacts are expressed as the sum of the directional signal components, the following Equation 1 to Equation 3 are expressed.

$$V_1 = |V_1^+|\cos(2\pi ft + \phi_1^+) + |V_1^-|\cos(2\pi ft + \phi_1^-) \qquad \text{Equation 1}$$

The $V_1$ denotes a voltage value of a signal at the first contact, the $|V_1^+|$ denotes the magnitude of the voltage with respect to a forward component of the signal at the first contact, the $|V_1^-|$ denotes the magnitude of the voltage with respect to a backward component of the signal at the first contact, the f denotes the frequency of the signal, t denotes a time, the $\phi_1^+$ denotes the phase of the voltage with respect to the forward component of the signal at the first contact, and the $\phi_1^-$ denotes the phase of the voltage with respect to the backward component of the signal at the first contact.

$$V_2 = |V_2^+|\cos(2\pi ft + \phi_2^+) + |V_2^-|\cos(2\pi ft + \phi_2^-) \qquad \text{Equation 2}$$

The $V_2$ is a voltage value of a signal at the second contact, the $|V_2^+|$ denotes the magnitude of the voltage with respect to a forward component of the signal at the second contact, the $|V_2^-|$ denotes the magnitude of the voltage with respect to a backward component of the signal at the second contact, the f denotes the frequency of the signal, t denotes a time, the $\phi_2^+$ denotes the phase of the voltage with respect to the forward component of the signal at the second contact, and the $\phi_2^-$ denotes the phase of the voltage with respect to the backward component of a signal at the second contact.

$$V_3 = |V_3^+|\cos(2\pi ft + \phi_3^+) + |V_3^-|\cos(2\pi ft + \phi_3^-) \qquad \text{Equation 3}$$

The $V_3$ is a voltage value of a signal at the third contact, the $|V_3^+|$ denotes the magnitude of the voltage with respect to a forward component of the signal at the third contact, the $|V_3^-|$ denotes the magnitude of the voltage with respect to a backward component of the signal at the third contact, the f denotes the frequency of the signal, t denotes a time, the $\phi_3^+$ denotes the phase of the voltage with respect to the forward component of the signal at the third contact, and the $\phi_3^-$ denotes the phase of the voltage with respect to the backward component of a signal at the third contact.

As described above, Equation 1 to Equation 3 may imply pieces of information (e.g., voltages) about a signal acquired from each contact of the couplers of the small reflection coefficient detection circuit according to an embodiment of the disclosure. Voltages of the signal passing through the main transmission line may be obtained by the couplers, and voltages of the obtained signal may be transmitted to an RF element in order to extract the magnitude of the voltages of the obtained signal. In order to extract the magnitude of the signal, a non-linear element (e.g., a diode) may be used in the RF element. The process of extracting the magnitude of the signal by the non-linear element is as shown in the following Equation.

$$|V_1| = \sqrt{|V_1^+|^2 + |V_1^-|^2 + 2|V_1^+||V_1^-|\cos(\phi_1^+ - \phi_1^-)} \qquad \text{Equation 4}$$

The $V_1$ denotes a voltage value of a signal at the first contact, the $|V_1^+|$ denotes the magnitude of the voltage with respect to a forward component of the signal at the first contact, the $|V_1^+|$ denotes the magnitude of the voltage with respect to a backward component of the signal at the first contact, the $\phi_1^+$ denotes the phase of the voltage with respect to the forward component of the signal at the first contact, and the $\phi_1^-$ denotes the phase of the voltage with respect to the backward component of the signal at the first contact.

$$|V_2| = \sqrt{|V_2^+|^2 + |V_2^-|^2 + 2|V_2^+||V_2^-|\cos(\phi_2^+ - \phi_2^-)} \qquad \text{Equation 5}$$

The $V_2$ is a voltage value of a signal at the second contact, the $|V_2^+|$ denotes the magnitude of the voltage with respect to a forward component of the signal at the second contact, the $|V_2^-|$ denotes the magnitude of the voltage with respect to a backward component of the signal at the second contact, the $\phi_2^+$ denotes the phase of the voltage with respect to the forward component of the signal at the second contact, and the $\phi_2^-$ denotes the phase of the voltage with respect to the backward component of a signal at the second contact.

$$|V_3| = \sqrt{|V_3^+|^2 + |V_3^-|^2 + 2|V_3^+||V_3^-|\cos(\phi_3^+ - \phi_3^-)} \qquad \text{Equation 6}$$

The $V_3$ is a voltage value of a signal at the third contact, the $|V_3^+|$ denotes the magnitude of the voltage with respect to a forward component of the signal at the third contact, the $|V_3^-|$ denotes the magnitude of the voltage with respect to a backward component of the signal at the third contact, the $\phi_3^+$ denotes the phase of the voltage with respect to the forward component of the signal at the third contact, and the $\phi_3^-$ denotes the phase of the voltage with respect to the backward component of a signal at the third contact.

Considering the above equations, the magnitude of the voltage of the signal at the first contact, the second contact, and the third contact may be determined by the magnitude and phase of the voltage in the forward and backward directions at each contact. Here, when the magnitude of the voltage of the signal at the first contact and the third contact is summarized with respect to the second contact as shown in the following equation.

$$|V_1|^2 = |V_1^+|^2 + |V_1^-|^2 + 2|V_1^+||V_1^-|\cos(\phi_1^+ - \phi_1^-) \qquad \text{Equation 7}$$
$$= |V_2^+|^2 + |V_2^-|^2 + 2|V_2^+||V_2^-|\cos(\phi_2^+ - \phi_2^- + 2\theta_1)$$

The $V_1$ denotes a voltage value of a signal at the first contact, the $|V_1^+|$ denotes the magnitude of the voltage with respect to a forward component of the signal at the first contact, the $|V_1^-|$ denotes the magnitude of the voltage with respect to a backward component of the signal at the first contact, the $\phi_1^+$ denotes the phase of the voltage with respect to the forward component of the signal at the first contact, the $\phi_1^-$ denotes the phase of the voltage with respect to the backward component of the signal at the first contact, the $|V_2^+|$ denotes the magnitude of the voltage with respect to a forward component of the signal at the second contact, the $|V_2^-|$ denotes the magnitude of the voltage with respect to a backward component of the signal at the second contact, the $\phi_2^+$ denotes the phase of the voltage with respect to the forward component of the signal at the second contact, the $\phi_2^-$ denotes the phase of the voltage with respect to the backward component of the signal at the second contact, and $\theta_1$ denotes an electrical distance from the first contact to the second contact.

$$|V_3|^2 = |V_3^+|^2 + |V_3^-|^2 + 2|V_3^+||V_3^-|\cos(\phi_3^+ - \phi_3^-) \qquad \text{Equation 8}$$
$$= |V_2^+|^2 + |V_2^-|^2 + 2|V_2^+||V_2^-|\cos(\phi_2^+ - \phi_2^- - 2\theta_2)$$

The $V_3$ is a voltage value of a signal at the third contact, the $|V_3^+|$ denotes the magnitude of the voltage with respect to a forward component of the signal at the third contact, the $|V_3^-|$ denotes the magnitude of the voltage with respect to a backward component of the signal at the third contact, the $\phi_3^+$ denotes the phase of the voltage with respect to the forward component of the signal at the third contact, $\phi_3^-$ denotes the phase of the voltage with respect to the backward component of the signal at the third contact, the $|V_2^+|$ denotes the magnitude of the voltage with respect to a forward component of the signal at the second contact, the $|V_2^-|$ denotes the magnitude of the voltage with respect to a backward component of the signal at the second contact, the $\phi_2^+$ denotes the phase of the voltage with respect to the forward component of the signal at the second contact, the $\phi_2^-$ denotes the phase of the voltage with respect to the backward component of the signal at the second contact, and $\theta_2$ denotes an electrical distance from the second contact to the third contact.

As described above, Equation 4 to Equation 6 may imply the magnitude of a signal, which is extracted using information (e.g., voltage) about a signal transmitted from each coupler, by the RF elements of the small reflection coefficient detection circuit according to an embodiment of the disclosure. Equation 7 may imply a relationship between a voltage at the first contact and a voltage at the second contact, and Equation 8 may imply a relationship between a voltage at the third contact and a voltage at the second contact.

As such, based on the magnitude of the extracted signal, a reflection coefficient for the signal may be calculated by the signal processor 340 of FIG. 3. The process of calculating the reflection coefficient from the magnitude of the extracted signal is as follows.

$$X_1 = \frac{|V_2|^2}{|V_1|^2} = \frac{|V_2^+|^2 + |V_2^-|^2 + 2|V_2^+||V_2^-|\cos(\phi_2^+ - \phi_2^-)}{|V_2^+|^2 + |V_2^-|^2 + 2|V_2^+||V_2^-|\cos(\phi_2^+ - \phi_2^- + 2\theta_1)} \qquad \text{Equation 9}$$

The $X_1$ denotes a ratio of $|V_2|^2$ to $|V_1|^2$, the $V_1$ denotes a voltage value of a signal at the first contact, the $V_2$ denotes a voltage value of a signal at the second contact, the $|V_1^+|$ denotes the magnitude of the voltage with respect to a forward component of the signal at the first contact, the $|V_1^-|$ denotes the magnitude of the voltage with respect to a backward component of the signal at the first contact, the $\phi_1^+$ denotes the phase of the voltage with respect to the forward component of the signal at the first contact, the $\phi_1^-$ denotes the phase of the voltage with respect to the backward component of the signal at the first contact, the $|V_2^+|$ denotes the magnitude of the voltage with respect to a forward component of the signal at the second contact, the $|V_2^-|$ denotes the magnitude of the voltage with respect to a backward component of the signal at the second contact, the $\phi_2^+$ denotes the phase of the voltage with respect to the forward component of the signal at the second contact, the $\phi_2^-$ denotes the phase of the voltage with respect to the backward component of the signal at the second contact, and $\theta_1$ denotes an electrical distance from the first contact to the second contact.

When the reflection coefficient at the second contact is called $\Gamma_2$, the reflection coefficient may be defined by a forward voltage and a backward voltage, and Equation 9 may be summarized as the following equation.

$$X_1 = \frac{1 + |\Gamma_2|^2 + 2|\Gamma_2|\cos(\phi_2^+ - \phi_2^-)}{1 + |\Gamma_2|^2 + 2|\Gamma_2|\cos(\phi_2^+ - \phi_2^- + 2\theta_1)} \qquad \text{Equation 10}$$

The $X_1$ denotes a ratio of $|V_2|^2$ to $|V_1|^2$, the $\Gamma_2$ denotes the reflection coefficient at the second contact, the $\phi_2^+$ denotes the phase of the voltage with respect to the forward component of the signal at the second contact, the $\phi_2^+$ denotes the phase of the voltage with respect to the backward component of the signal at the second contact, and $\theta_1$ denotes an electrical distance from the first contact to the second contact.

Similarly, if Equation 8 may be summarized as the following equation.

$$X_2 = \frac{|V_2|^2}{|V_3|^2} = \frac{|V_2^+|^2 + |V_2^-|^2 + 2|V_2^+||V_2^-|\cos(\phi_2^+ - \phi_2^-)}{|V_2^+|^2 + |V_2^-|^2 + 2|V_2^+||V_2^-|\cos(\phi_2^+ - \phi_2^- - 2\theta_2)} \qquad \text{Equation 11}$$

The $X_2$ denotes a ratio of $|V_2|^2$ to $|V_3|^2$, the $V_3$ is a voltage value of a signal at the third contact, the $V_2$ denotes a voltage value of a signal at the second contact, the $|V_2^+|$ denotes the magnitude of the voltage with respect to a forward component of the signal at the second contact, the $|V_2^-|$ denotes the magnitude of the voltage with respect to a backward component of the signal at the second contact, the $\phi_2^+$ denotes the phase of the voltage with respect to the forward component of the signal at the second contact, the $\phi_2^-$ denotes the phase of the voltage with respect to the backward component of the signal at the second contact, and $\theta_2$ denotes an electrical distance from the second contact to the third contact.

$$X_2 = \frac{1 + |\Gamma_2|^2 + 2|\Gamma_2|\cos(\phi_2^+ - \phi_2^-)}{1 + |\Gamma_2|^2 + 2|\Gamma_2|\cos(\phi_2^- - \phi_2^- - 2\theta_2)} \qquad \text{Equation 12}$$

The $X_2$ denotes a ratio of $|V_2|^2$ to $|V_3|^2$, the $\Gamma_2$ denotes the reflection coefficient at the second contact, the $\phi_2^+$ denotes the phase of the voltage with respect to the forward component of the signal at the second contact, the $\phi_2^-$ denotes the phase of the voltage with respect to the backward component of the signal at the second contact, and $\theta_2$ denotes an electrical distance from the second contact to the third contact.

The above-mentioned Equation 10 and Equation 12 are summarized as the following Equation 13 and Equation 14, respectively.

$$(1+|\Gamma_2|^2)(X_1-1)=-[2|\Gamma_2|\{X_1\cos(\phi_2^+-\phi_2^-+2\theta_1)-\cos(\phi_2^+-\phi_2^-)\}] \qquad \text{Equation 13}$$

The $X_1$ denotes a ratio of $|V_2|^2$ to $|V_1|^2$, the $\Gamma_2$ denotes the reflection coefficient at the second contact, the $\phi_2^+$ denotes the phase of the voltage with respect to the forward component of the signal at the second contact, the $\phi_2^-$ denotes the phase of the voltage with respect to the backward component of the signal at the second contact, and $\theta_1$ denotes an electrical distance from the first contact to the second contact.

$$(1+|\Gamma_2|^2)(X_2-1)=-[2|\Gamma_2|\{X_2\cos(\phi_2^+-\phi_2^-+2\theta_2)-\cos(\phi_2^+-\phi_2^-)\}] \qquad \text{Equation 14}$$

The $X_2$ denotes a ratio of $|V_2|^2$ to $|V_3|^2$, the $\Gamma_2$ denotes the reflection coefficient at the second contact, the $\phi_2^+$ denotes the phase of the voltage with respect to the forward component of the signal at the second contact, the $\phi_2^-$ denotes the phase of the voltage with respect to the backward component of the signal at the second contact, and $\theta_2$ denotes an electrical distance from the second contact to the third contact.

A ratio of the summarized Equation 13 and Equation 14 may be summarized as the following equation.

$$K = \frac{(1+|\Gamma_2|^2)(X_1-1)}{(1+|\Gamma_2|^2)(X_2-1)} = \qquad \text{Equation 15}$$
$$\frac{-[2|\Gamma_2|\{X_1\cos(\phi_2^+-\phi_2^-+2\theta_1)-\cos(\phi_2^+-\phi_2^-)\}]}{-[2|\Gamma_2|\{X_2\cos(\phi_2^+-\phi_2^--2\theta_2)-\cos(\phi_2^+-\phi_2^-)\}]}$$

The K denotes a ratio of $(X_1-1)$ to $(X_2-1)$, the $X_1$ denotes a ratio of $|V_2|^2$ to $|V_1|^2$, the $X_2$ denotes a ratio of $|V_2|^2$ to $|V_3|^2$, the $\Gamma_2$ denotes the reflection coefficient at the second contact, the $\phi_2^+$ denotes the phase of the voltage with respect to the forward component of the signal at the second contact, the $\phi_2^-$ denotes the phase of the voltage with respect to the backward component of the signal at the second contact, $\theta_1$ denotes an electrical distance from the first contact to the second contact, and $\theta_2$ denotes an electrical distance from the second contact to the third contact.

With regard to K of the above described equation, K is summarized by means of $(\phi_2^--\phi_2^+)$, which is the phase of reflection coefficient at the second contact, the following equation is obtained.

$$\tan(\phi_2^+-\phi_2^-) = \frac{X_1\cos(2\theta_1)-KX_2\cos(2\theta_2)+K-1}{KX_2\sin(2\theta_2)+X_1\sin(2\theta_1)} \qquad \text{Equation 16}$$
$$\phi_2^--\phi_2^+ = -\tan^{-1}\left(\frac{X_1\cos(2\theta_1)-KX_2\cos(2\theta_2)+K-1}{KX_2\sin(2\theta_2)+X_1\sin(2\theta_1)}\right)$$

The K denotes a ratio of $(X_1-1)$ to $(X_2-1)$, the $X_1$ denotes a ratio of $|V_2|^2$ to $|V_1|^2$, the $X_2$ denotes a ratio of $|V_2|^2$ to $|V_3|^2$, the $\phi_2^+$ denotes the phase of the voltage with respect to the forward component of the signal at the second contact, the $\phi_2^-$ denotes the phase of the voltage with respect to the backward component of the signal at the second contact, $\theta_1$ denotes an electrical distance from the first contact to the second contact, and $\theta_2$ denotes an electrical distance from the second contact to the third contact.

In the above-described Equation 16, $(\phi_2^--\phi_2^+)$ may denote a phase of a reflection coefficient. In order to derive a discriminant for the phase of the reflection coefficient, when Equation 13 is summarized to a quadratic equation for the magnitude of reflection coefficient $(|\Gamma_2|)$, as follows.

$$|\Gamma_2|^2 + 2\frac{X_1\cos(\phi_2^+-\phi_2^-+2\theta_1)-\cos(\phi_2^+-\phi_2^-)}{X_1-1}|\Gamma_2| + 1 = 0 \qquad \text{Equation 17}$$

The $X_1$ denotes a ratio of $|V_2|^2$ to $|V_1|^2$, the $\Gamma_2$ denotes the reflection coefficient at the second contact, the $\phi_2^+$ denotes the phase of the voltage with respect to the forward component of the signal at the second contact, the $\phi_2^-$ denotes the phase of the voltage with respect to the backward component of the signal at the second contact, and $\theta_1$ denotes an electrical distance from the first contact to the second contact.

In the above-mentioned Equation 17, the absolute value of the reflection coefficient corresponds to a value of 0 or more, $$\frac{X_1\cos(\phi_2^+-\phi_2^-+2\theta_1)-\cos(\phi_2^+-\phi_2^-)}{X_1-1}$$

may be configured to be smaller or equal to 0

$$\left(\frac{X_1\cos(\phi_2^+-\phi_2^-+2\theta_1)-\cos(\phi_2^+-\phi_2^-)}{X_1-1} \le 0\right).$$

The discriminants summarizing them are as follows.

$$D_1 = \frac{X_1\cos(2\theta_1)-1}{X_1-1} \qquad \text{Equation 18}$$
$$D_2 = -\frac{X_1\sin(2\theta_1)}{X_1-1}\tan(\phi_2^--\phi_2^+)$$

The $D_1$ denotes a first discriminant for a phase of a reflection coefficient, $D_2$ denotes a second discriminant for a phase of a reflection coefficient, and $X_1$ denotes a ratio of the square of the magnitude of the voltage of the signal at the second contact to the square of the magnitude of the voltage of the signal at the first contact, the $\phi_2^+$ denotes the phase of the voltage with respect to the forward component of the signal at the second contact, the $\phi_2^-$ denotes the phase of the voltage with respect to the backward component of the signal at the second contact, $\theta_1$ denotes an electrical distance from the first contact to the second contact, and $\theta_2$ denotes an electrical distance from the second contact to the third contact.

Referring to Equation 18 above, when the first discriminant is greater than the second discriminant $(D_1 > D_2)$, the phase $(\phi_2^--\phi_2^+)$ of the reflection coefficient may correspond to a phase on the second quadrant or the third quadrant. Conversely, when the first discriminant is less than the second discriminant $(D_1 < D_2)$, the phase $(\phi_2^--\phi_2^+)$ of the reflection coefficient may correspond to a phase on the first quadrant or the fourth quadrant. Accordingly, the phase of the reflection coefficient calculated by the signal processor 340 of FIG. 3 may be determined by considering the above-described conditions.

In addition, the process of calculating the magnitude of the reflection coefficient may be determined by the above-mentioned Equation 17. Referring to the above-mentioned Equation 17, the process may be summarized to a quadratic equation for the magnitude of the reflection coefficient. If the solution is obtained through a quadratic formula for the magnitude of the reflection coefficient, the following equation is obtained.

$$|\Gamma_2| = -b \pm \sqrt{b^2 - 1},$$ 
$$\left( b = \frac{X_1 \cos(\phi_2^+ - \phi_2^- + 2\theta_1) - \cos(\phi_2^+ - \phi_2^-)}{X_1 - 1} \right)$$

Equation 19

The $X_1$ denotes a ratio of $|V_2|^2$ to $|V_1|^2$, the $\Gamma_2$ denotes the reflection coefficient at the second contact, the $\phi_2^+$ denotes the phase of the voltage with respect to the forward component of the signal at the second contact, the $\phi_2^-$ denotes the phase of the voltage with respect to the backward component of the signal at the second contact, and $\phi_1$ denotes an electrical distance from the first contact to the second contact.

Referring to the above-mentioned Equation 19, as a condition for specifying a solution (or root) for the magnitude of the reflection coefficient, the magnitude of the reflection coefficient may be determined based on that the magnitude of the reflection coefficient is less than 1 ($|\Gamma_2|<1$).

Accordingly, considering the above-described equations, the signal processor 340 of FIG. 3 may determine the magnitude and phase of the reflection coefficient by using information on a signal received from the RF element 330 (e.g., the magnitude of voltage for the three contacts) and distances (e.g., a first length and as the second length) between the contacts determined during design. Accordingly, the electronic device may determine the reflection coefficient based on the determined magnitude and phase of the reflection coefficient.

Referring to FIG. 3, the reflection coefficient detection circuit is illustrated as being connected to the transmission line at three contacts, but this is only an embodiment for implementing a reflection coefficient detection circuit of a smaller size, this is not construed as excluding other embodiments of the disclosure. For example, the transmission line and the reflection coefficient detection circuit may be connected at nine contacts, the nine contacts may be divided into three parts, representative values (e.g., average value, median value, etc.) of three voltage values of a signal acquired from each of three parts may be calculated, and the reflection coefficient may be detected using the three calculated voltage values.

FIG. 3 illustrates a structure of a small reflection coefficient detection circuit and an electronic device including the same according to an embodiment of the disclosure. In addition, through FIG. 3, a process of calculating the reflection coefficient through the magnitude of the voltage for the plurality of contacts and an electrical distance between the plurality of contacts, detected by the small reflection coefficient detection circuit according to an embodiment of the disclosure has been described. Hereinafter, examples of a coupler and an RF element in the structure of a small reflection coefficient detection circuit according to embodiments of the disclosure are described in FIGS. 4 and 5.

Figure 4:
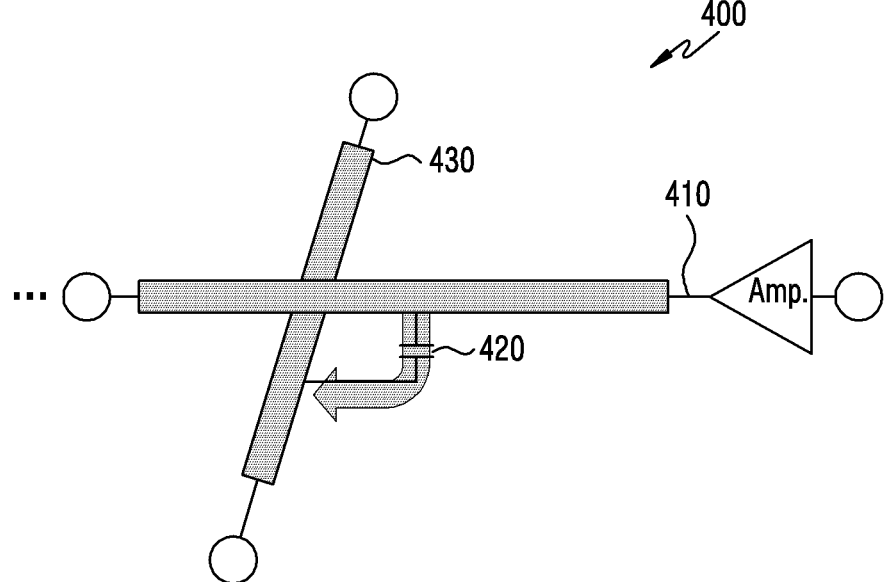
FIG. 4 illustrates a coupler of a reflection coefficient detection circuit according to an embodiment of the disclosure.

FIG. 4 illustrates a coupler of a reflection coefficient detection circuit according to an embodiment of the disclosure. FIG. 4 illustrates a part of the electronic device 150 of FIG. 1 for convenience of explanation. However, this is merely an example for convenience of explanation, and the disclosure is not limited thereto. For example, the coupler of the small reflection coefficient detection circuit according to an embodiment of the disclosure may not only be electrically connected to a transmission line (hereinafter, referred to as a main transmission line) between a power amplifier and an antenna, but also may be electrically connected to a transmission line between the power amplifier and the mixers.

Referring to FIG. 4, an electronic device 400 may include a power amplifier, a main transmission line 410, a coupler 420, and an RF element 430. According to an embodiment of the disclosure, the coupler 420 may be electrically connected to the main transmission line 410. Referring to FIG. 4, one contact is illustrated as an example, but the disclosure is not limited thereto. Referring to FIG. 3, the main transmission line 410 may be coupled to the coupler 420 through each of the three contacts. According to an embodiment of the disclosure, the coupler 420 may refer to a structure including a coupled transmission line disposed in an area adjacent to the main transmission line 410. In other words, since the coupling transmission line configuring the coupler 420 is disposed in an area adjacent to the main transmission line 410, capacitance due to coupling may be formed. The coupler 420 may refer to a capacitive coupler. Referring to FIG. 4, a capacitive coupler is illustrated, but the disclosure is not limited thereto. The coupler 420 may also be configured by a resistive coupler. According to an embodiment of the disclosure, the coupler 420 may further include a resistor, and a resistor is disposed between the coupled transmission line of the coupler 420 and the main transmission line 410, and thus the coupler 420 may be electrically connected to the main transmission line 410.

In addition, the coupler 420 may be connected to the RF element 430. Accordingly, information about the signal (e.g., the voltage of the signal) acquired by the coupler 420 may be transmitted to the RF element 430. As described above, the coupler 420 electrically connected to the main transmission line 410 may be connected through a plurality of contacts, and the total length of the plurality of contacts may be formed to be shorter than a specific length. Here, the specific length may imply $\lambda/4$ when the wavelength of the signal passing through the main transmission line 410 is $\lambda$. For example, the total length connecting between the plurality of contacts may be formed to be about $\lambda/10$ to about $\lambda/20$.

Figure 5:
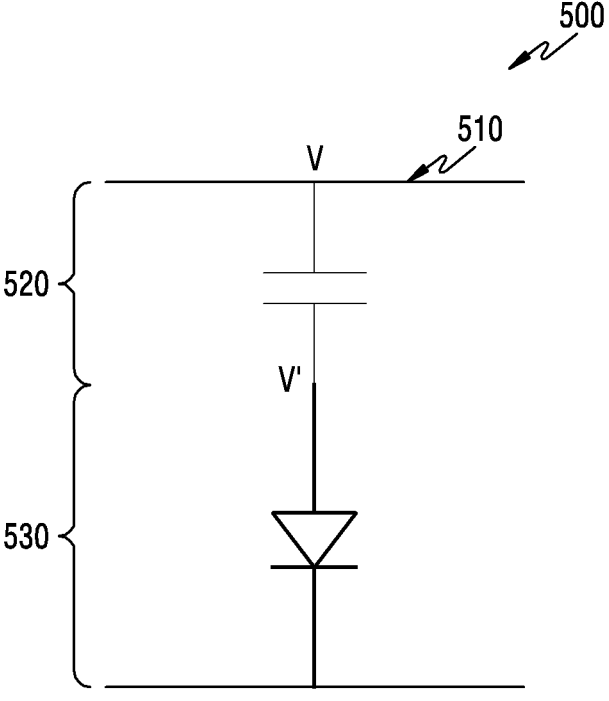
FIG. 5 illustrates a radio frequency (RF) element of a reflection coefficient detection circuit according to an embodiment of the disclosure.

FIG. 5 illustrates a radio frequency (RF) element of a reflection coefficient detection circuit according to an embodiment of the disclosure.

Referring to FIG. 5, some RF components of the electronic device 150 of FIG. 1 are shown in order to describe the RF element for detecting the reflection coefficient, but this is only an example for convenience of explanation and is not construed as limiting the disclosure. For example, the small reflection coefficient detection circuit according to an embodiment of the disclosure may be electrically connected to a main transmission line at a plurality of contacts. For another example, the coupler of the small reflection coefficient detection circuit according to an embodiment of the disclosure may be configured by a resistive coupler rather than a capacitive one.

Referring to FIG. 5, an electronic device 500 may include a main transmission line 510, a coupler 520, and an RF element 530. According to an embodiment of the disclosure, the coupler 520 may be electrically connected to the main transmission line 510 and may be connected to the RF element 530. In addition, information (e.g., voltage) on a signal acquired from a contact (e.g., a first contact, a second contact, or a third contact) of the main transmission line 510 may be transmitted by the coupler 520.

According to an embodiment of the disclosure, the RF element 530 may extract the magnitude of the signal based on the information on the acquired signal. In other words, the RF element 530 may include a non-linear element for extracting the magnitude of the signal. For example, the RF element 530 may include a diode. However, the disclosure is not limited thereto, and may be understood as that the RF element 530 includes an element for extracting the magnitude of a signal.

When the RF element 530 includes a diode, the process of extracting the magnitude of a signal is as follows. For example, when a voltage at a contact that is a connection point between the coupler 520 and the main transmission line 510 is called "V", a voltage at another point of the coupler 520 may be configured as V'. Here, if a current flowing through the diode of the RF element 530 is called "i", $i=\alpha(V')^2$. Here, $\alpha$ may imply a proportional constant by a diode. In other words, a current i may flow through the diode of the RF element 530, and when the current flows through a specific node, the voltage at the specific node may be configured as a value proportional to the square of the voltage of the signal. This voltage value is proportional to the magnitude of the acquired signal and accordingly, the RF element 530 may extract the magnitude of the acquired signal.

Examples of the configuration of the small reflection coefficient detection circuit according to an embodiment of the disclosure have been described in FIGS. 4 and 5. As described above, the coupler is a capacitive or resistive coupler, and is coupled to the main transmission line to obtain information (e.g., voltage) of a signal flowing through the main transmission line. The RF element having received the information of the signal acquired from the coupler may extract the magnitude of the signal through a configuration (e.g., a diode) capable of extracting the magnitude of the signal based on the information of the signal. Hereinafter, a small reflection coefficient circuit according to an embodiment of the disclosure configured by specific elements will be described in FIG. 6, and through which a reflection coefficient detection process will be described.

Figure 6:
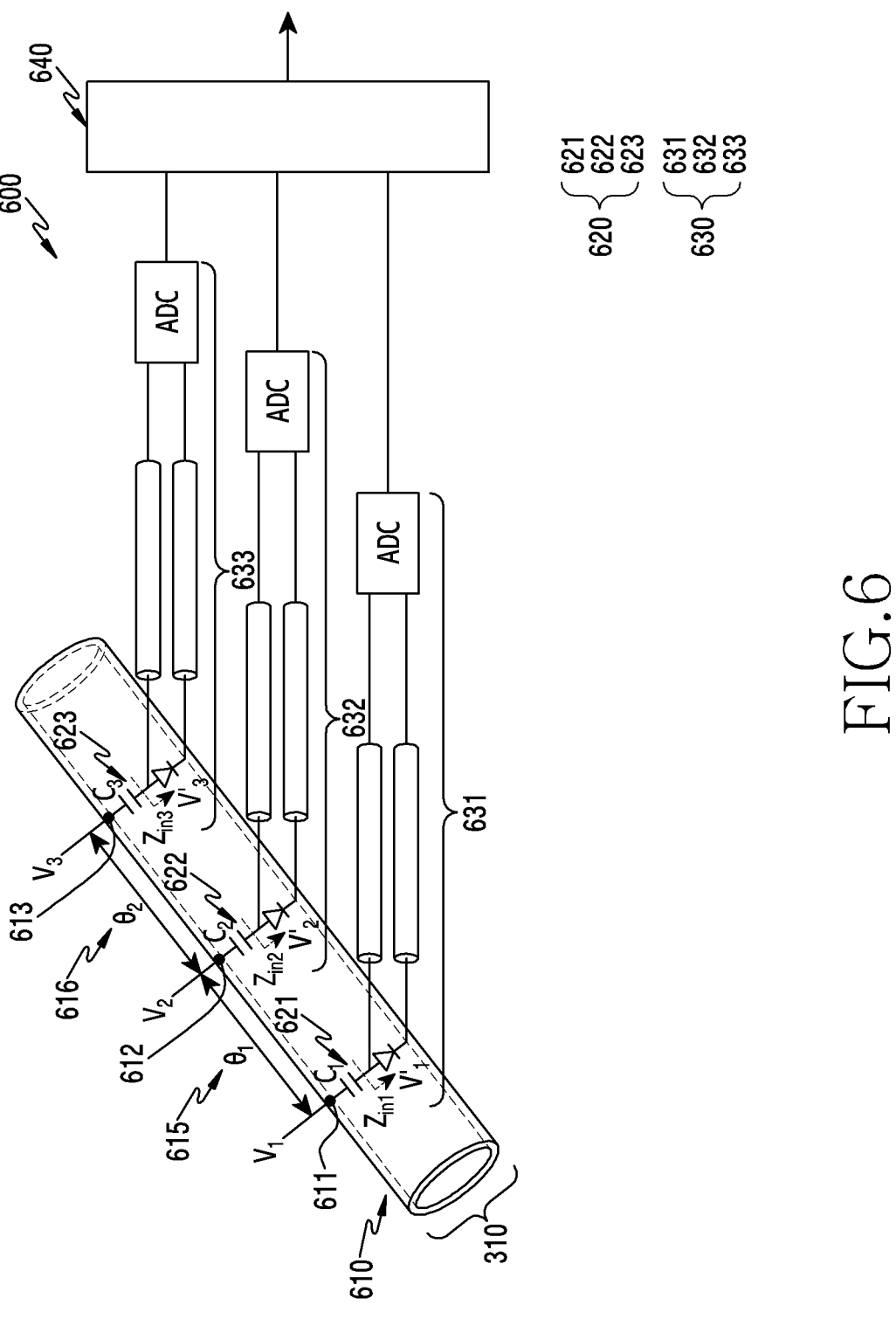
FIG. 6 illustrates a reflection coefficient detection circuit according to an embodiment of the disclosure.

FIG. 6 illustrates a reflection coefficient detection circuit according to an embodiment of the disclosure.

Referring to FIG. 6, a reflection coefficient detection circuit 600 of FIG. 6 is an example of the reflection coefficient detection circuit 300 of FIG. 3 and shows each configuration of the reflection coefficient detection circuit 600. However, the disclosure is not limited thereto. For example, a coupler 620 of the reflection coefficient detection circuit 600 may be configured by a resistive coupler rather than a capacitive coupler shown in FIG. 6. In addition, for example, an RF element 630 of the reflection coefficient detection circuit 600 may include a non-linear element, such as a diode and analog to digital converter (ADC), or a configuration including an equivalent function (extracting the magnitude of a signal) thereof, in order to extract the magnitude of the signal.

Referring to FIG. 6, the reflection coefficient detection circuit 600 may include a coupler 620, an RF element 630, and a signal processor 640. According to an embodiment of the disclosure, the coupler 620 may be disposed between the RF element 630 and a transmission line 610 in the electronic device. In this case, the coupler 620 may include a plurality of couplers (e.g., a first coupler 621, a second coupler 622, and a third coupler 623). Here, the transmission line 610 may be referred to as a main transmission line. In addition, the RF element 630 may be disposed between the coupler 620 and the signal processor 640. In this case, the RF element 630 may include a plurality of RF elements (e.g., a first RF element 631, a second RF element 632, and a third RF element 633). According to an embodiment of the disclosure, the plurality of couplers may be connected to a plurality of RF elements in a one-to-one basis. For example, the first coupler 621 may be connected to the first RF element 631. For another example, the second coupler 622 may be connected to the second RF element 632. As another example, the third coupler 623 may be connected to the third RF element 633. According to an embodiment of the disclosure, the signal processor 640 may be connected to the RF elements 630. In other words, the first RF element 631, the second RF element 632, and the third RF element 633 may be connected to the signal processor 640.

According to an embodiment of the disclosure, the couplers 620 may be connected to the transmission line 610 and three contacts. For example, the first coupler 621 may be electrically connected with a first contact 611, the second coupler 622 may be electrically connected with a second contact 612, and the third coupler 623. may be electrically connected to a third contact 613. In addition, the second coupler 622 may be spaced apart from the first coupler 621 by a first length 615 and may be spaced apart from the third coupler 623 by a second length 616. According to an embodiment of the disclosure, the first length 615 may be formed to be the same as the second length 616. According to another embodiment of the disclosure, the first length 615 may be formed to be different from the second length 616. According to an embodiment of the disclosure, the distance between the contacts may be formed to be the same as the distance between the couplers 620. However, this is only an example for convenience of explanation, and the disclosure is not limited thereto. The couplers may not be spaced apart by the same interval as that between the contacts. According to an embodiment of the disclosure, the coupler 620 may be connected to the RF element 630. For example, the coupler 620 may be connected to the RF element 630 in a one-to-one basis.

According to an embodiment of the disclosure, the coupler 620 may include a transmission line. Here, the transmission line included in the coupler 620 may be referred to as a coupled transmission line. For example, the first coupler 621 may be configured by a coupled transmission line, the second coupler 622 may be configured by a coupled transmission line, and the third coupler 623 may be configured by a coupled transmission line. In addition, the coupler 620 may be disposed to be spaced apart from the transmission line 610 by a predetermined distance, and thus may be electrically connected thereto. For example, the first coupler 621 may be disposed to be spaced apart from the transmission line 610 by a predetermined distance, the second coupler 622 may be disposed to be spaced apart from the transmission line 610 by a predetermined distance, and the third coupler 623 may be disposed to be spaced apart from the transmission line 610 by a predetermined distance. The coupler 620 is electrically connected to the transmission line 610 while being disposed to be spaced apart from the transmission line 610, and thus may be connected to the transmission line 610 by coupling. Accordingly, the coupler 620 may be configured by an element having an impedance component. For example, the coupler 620 may be configured by a capacitive coupler. According to another embodiment of the disclosure, the coupler 620 may be configured by a resistive coupler. For example, the coupler 620 may include a resistor, and the coupler 620 may be connected to the transmission line 610 through a resistor. Referring to FIG. 6, the coupler 620 is shown as an example of a capacitive coupler.

According to an embodiment of the disclosure, the coupler 620 may acquire information about a signal of the transmission line 610. For example, the first coupler 621 may acquire a voltage of the signal at the first contact 611 of the transmission line 610. As another example, the second coupler 622 may acquire a voltage of the signal at the second contact 612 of the transmission line 610. As still another example, the third coupler 623 may acquire a voltage of the signal at the third contact 613 of the transmission line 610. Here, acquisition may be understood to have the same meaning as that of extraction, detection, measurement, and sensing. The information on the signal as described above is expressed by the following equation.

$$V_1' = \left( \frac{Z_{in}}{\frac{1}{jwc} + Z_{in}} \right) V_1 = \qquad \text{Equation 20}$$

$$\left( \frac{Z_{in}}{\frac{1}{jwc} + Z_{in}} \right) \left\{ |V_1^+| \cos\left( 2\pi f t + \phi_1^+ + \angle\left( \frac{Z_{in}}{\frac{1}{jwc} + Z_{in}} \right) \right) + \right.$$

$$\left. |V_1^-| \cos\left( 2\pi f t + \phi_1^- + \angle\left( \frac{Z_{in}}{\frac{1}{jwc} + Z_{in}} \right) \right) \right\}$$

The $V_1$ denotes the voltage value of the signal at the first contact, the $V_1'$ is a voltage value at a node not connected to the first contact of the first coupler, the $Z_{in}$ denotes an input impedance formed when viewed the RF element in the first coupler, the j is an imaginary unit, the w is an angular frequency of a signal, the C is a capacitance due to coupling of the first coupler, the $|V_1^+|$ denotes the magnitude of the voltage with respect to a forward component of the signal at the first contact, the $|V_1^-|$ denotes the magnitude of the voltage with respect to a backward component of the signal at the first contact, the f denotes the frequency of the signal, t denotes a time, the $\phi_1^-$ denotes the phase of the voltage with respect to the forward component of the signal at the first contact, and the $\phi_1^-$ denotes the phase of the voltage with respect to the backward component of the signal at the first contact.

$$V_2' = \left( \frac{Z_{in}}{\frac{1}{jwc} + Z_{in}} \right) V_2 = \qquad \text{Equation 21}$$

$$\left( \frac{Z_{in}}{\frac{1}{jwc} + Z_{in}} \right) \left\{ |V_2^+| \cos\left( 2\pi f t + \phi_2^+ + \angle\left( \frac{Z_{in}}{\frac{1}{jwc} + Z_{in}} \right) \right) + \right.$$

$$\left. |V_2^-| \cos\left( 2\pi f t + \phi_2^- + \angle\left( \frac{Z_{in}}{\frac{1}{jwc} + Z_{in}} \right) \right) \right\}$$

The $V_2$ is a voltage value of a signal at the second contact, the $V_2'$ is a voltage value at a node not connected to the second contact of the second coupler, the $Z_{in}$ denotes an input impedance formed when viewed the RF element in the second coupler, the j is an imaginary unit, the w is an angular frequency of a signal, the C is a capacitance due to coupling of the second coupler, the $|V_2^+|$ denotes the magnitude of the voltage with respect to a forward component of the signal at the second contact, the $|V_2^-|$ denotes the magnitude of the voltage with respect to a backward component of the signal at the second contact, the f denotes the frequency of the signal, t denotes a time, the $\phi_2^+$ denotes the phase of the voltage with respect to the forward component of the signal at the second contact, and the $\phi_2^-$ denotes the phase of the voltage with respect to the backward component of a signal at the second contact.

$$V_3' = \left( \frac{Z_{in}}{\frac{1}{jwc} + Z_{in}} \right) V_3 = \qquad \text{Equation 22}$$

$$\left( \frac{Z_{in}}{\frac{1}{jwc} + Z_{in}} \right) \left\{ |V_3^+| \cos\left( 2\pi f t + \phi_3^+ + \angle\left( \frac{Z_{in}}{\frac{1}{jwc} + Z_{in}} \right) \right) + \right.$$

$$\left. |V_3^-| \cos\left( 2\pi f t + \phi_3^- + \angle\left( \frac{Z_{in}}{\frac{1}{jwc} + Z_{in}} \right) \right) \right\}$$

The $V_3$ is a voltage value of a signal at the third contact, the $V_3'$ is a voltage value at a node not connected to the third contact of the third coupler, the $Z_{in}$ denotes an input impedance formed when viewed the RF element in the third coupler, the j is an imaginary unit, the w is an angular frequency of a signal, the C is a capacitance due to coupling of the third coupler, the $|V_3^+|$ denotes the magnitude of the voltage with respect to a forward component of the signal at the third contact, the $|V_3^-|$ denotes the magnitude of the voltage with respect to a backward component of the signal at the third contact, the f denotes the frequency of the signal, t denotes a time, the $\phi_2^+$ denotes the phase of the voltage with respect to the forward component of the signal at the third contact, and the $\phi_3^-$ denotes the phase of the voltage with respect to the backward component of a signal at the third contact.

Referring to Equation 20 to Equation 22 described above, based on voltage values (e.g., $V_1$, $V_2$, $V_3$) at contacts electrically connected to one end of each of couplers, the voltage values (e.g., $V_1'$, $V_2'$, $V_3'$) at the other end of each of the couplers may be determined. In other words, the voltage value at the other end of each coupler may be determined by voltage division. Here, assuming that the structures of the transmission lines configuring couplers are all the same, the capacitance due to coupling formed by the transmission lines of couplers may all be the same as C, and the input impedances may all be the same as $Z_{in}$. The couplers 620 may transmit information about a signal acquired at the contacts to the RF elements 630.

According to an embodiment of the disclosure, the RF element 630 may be connected to the coupler 620. For example, the RF element 630 may be connected to the coupler 620 in a one-to-one basis. Specifically, the first RF element 631 may be connected to the first coupler 621, the second RF element 632 may be connected to the second coupler 622, and the third RF element 633 may be connected to the third coupler 623. In addition, the RF element 630 may be connected to the signal processor 640. In this case, each of the first RF element 631, the second RF element 632, and the third RF element 633 may be connected to the signal processor 640. However, the disclosure is not limited thereto, and the first RF element 631, the second RF element 632, and the third RF element 633 are integrated as one and connected to an element, such as a mixer, configured to perform signal processing, and then the integrated one may be connected to the signal processor 640.

According to an embodiment of the disclosure, the RF element 630 may include elements for measuring the magnitude of a signal received from the coupler 620. For example, when a signal envelope detection method is used as a method for measuring the magnitude of the signal received from the coupler 620, the RF element 630 may include a non-linear element (e.g., a diode) to measure the magnitude of the signal, and may include an analog to digital converter (ADC) configured to read values located in the envelope of the signal processed by the non-linear element.

In this case, for example, assuming that the signal passing through the transmission line 610 is in the form of a triangular wave, the frequency of the signal may correspond to $f_{chopping}$, and the frequency of the signal acquired by the coupler 620 may also be formed in the same manner as the above. In addition, a diode included in the RF element 630 is a non-linear element, and as shown in FIG. 5, a current proportional to the magnitude of the signal may flow through the diode. Accordingly, a process in which the RF element 630 measures the magnitude of the signal received from the coupler 620 is as follows.

$$\text{Equation 23}$$

$$(V_1')^2 \big|_{f_{chopping}} =$$

$$\beta \left| \frac{Z_{in}}{\frac{1}{jwc} + Z_{in}} \right| \left( \frac{|V_1^+|^2}{2} + \frac{|V_1^-|^2}{2} + |V_1^+||V_1^-|\cos(\phi_1^+ - \phi_1^-) \right) =$$

$$\beta \left| \frac{Z_{in}}{\frac{1}{jwc} + Z_{in}} \right| \left( \begin{array}{c} \frac{|V_2^+|^2}{2} + \frac{|V_2^-|^2}{2} + \\ |V_2^+||V_2^-|\cos(\phi_2^+ - \phi_2^- + 2\theta_1)) \end{array} \right)$$

The $V_1'$ is a voltage value at a node not connected to the first contact of the first coupler, the $f_{chopping}$ is the frequency of the signal, the $\beta$ is a proportional constant by a diode, the $Z_{in}$ denotes an input impedance formed when viewed the RF element in the first coupler, the j is an imaginary unit, the w is an angular frequency of a signal, the C is a capacitance due to coupling of the first coupler, the $|V_1^+|$ denotes the magnitude of the voltage with respect to a forward component of the signal at the first contact, the $|V_1^-|$ denotes the magnitude of the voltage with respect to a backward component of the signal at the first contact, the $\phi_1^+$ denotes the phase of the voltage with respect to the forward component of the signal at the first contact, the $\phi_1^-$ denotes the phase of the voltage with respect to the backward component of the signal at the first contact, the $|V_2^+|$ denotes the magnitude of the voltage with respect to a forward component of the signal at the second contact, the $|V_2^-|$ denotes the magnitude of the voltage with respect to a backward component of the signal at the second contact, the $\phi_2^+$ denotes the phase of the voltage with respect to the forward component of the signal at the second contact, the $\phi_2^-$ denotes the phase of the voltage with respect to the backward component of the signal at the second contact, and $\theta_1$ denotes an electrical distance from the first contact to the second contact.

$$\text{Equation 24}$$

$$(V_2')^2 \big|_{f_{chopping}} =$$

$$\beta \left| \frac{Z_{in}}{\frac{1}{jwc} + Z_{in}} \right| \left( \frac{|V_2^+|^2}{2} + \frac{|V_2^-|^2}{2} + |V_2^+||V_2^-|\cos(\phi_2^+ - \phi_2^-) \right)$$

The $V_2'$ is a voltage value at a node not connected to the second contact of the second coupler, the $f_{chopping}$ is the frequency of the signal, the $\beta$ is a proportional constant by a diode, the $Z_{in}$ denotes an input impedance formed when viewed the RF element in the second coupler, the j is an imaginary unit, the w is an angular frequency of a signal, the C is a capacitance due to coupling of the second coupler, the $|V_2^+|$ denotes the magnitude of the voltage with respect to a forward component of the signal at the second contact, the $|V_2^-|$ denotes the magnitude of the voltage with respect to a backward component of the signal at the second contact, the $\phi_2^+$ denotes the phase of the voltage with respect to the forward component of the signal at the second contact, and the $\phi_2^-$ denotes the phase of the voltage with respect to the backward component of a signal at the second contact.

$$\text{Equation 25}$$

$$(V_3')^2 \big|_{f_{chopping}} =$$

$$\beta \left| \frac{Z_{in}}{\frac{1}{jwc} + Z_{in}} \right| \left( \frac{|V_3^+|^2}{2} + \frac{|V_3^-|^2}{2} + |V_3^+||V_3^-|\cos(\phi_3^+ - \phi_3^-) \right) =$$

$$\beta \left| \frac{Z_{in}}{\frac{1}{jwc} + Z_{in}} \right| \left( \begin{array}{c} \frac{|V_2^+|^2}{2} + \frac{|V_2^-|^2}{2} + \\ |V_2^+||V_2^-|\cos(\phi_2^+ - \phi_2^- + 2\theta_3)) \end{array} \right)$$

The $V_3'$ is a voltage value at a node not connected to the third contact of the third coupler, the $f_{chopping}$ is the frequency of the signal, the $\beta$ is a proportional constant by a diode, the $Z_{in}$ denotes an input impedance formed when viewed the RF element in the third coupler, the j is an imaginary unit, the w is an angular frequency of a signal, the C is a capacitance due to coupling of the third coupler, the $|V_3^+|$ denotes the magnitude of the voltage with respect to a forward component of the signal at the third contact, the $|V_3^+|$ denotes the magnitude of the voltage with respect to a backward component of the signal at the third contact, the $\phi_2^+$ denotes the phase of the voltage with respect to the forward component of the signal at the third contact, $\phi_3^-$ denotes the phase of the voltage with respect to the backward component of the signal at the third contact, the $|V_2^+|$ denotes the magnitude of the voltage with respect to a forward component of the signal at the second contact, the $|V_2^-|$ denotes the magnitude of the voltage with respect to a backward component of the signal at the second contact, the $\phi_2^+$ denotes the phase of the voltage with respect to the forward component of the signal at the second contact, the $\phi_2^-$ denotes the phase of the voltage with respect to the backward component of the signal at the second contact, and $\theta_2$ denotes an electrical distance from the second contact to the third contact.

Referring to the above-mentioned Equation 23 to Equation 25, the voltage values, which are information about the signal transmitted from each of couplers, may be converted to a value for the magnitude of the signal through a diode which is a non-linear element of each RF element. In addition, a peak-to-peak voltage for each voltage may be extracted by the ADC as a signal of a relatively low frequency band having an $f_{chopping}$ value.

According to an embodiment of the disclosure, the signal processor 640 may be connected to the RF element 630. For example, the signal processor 640 may be individually connected to each RF element 630. In other words, the signal processor 640 may be individually connected to the first RF element 631, the second RF element 632, and the third RF element 633. As another example, the signal processor 640 may be connected to all of the RF elements 630 by one transmission line. Specifically, the first RF element 631, the second RF element 632, and the third RF element 633 may be integrated by a connector such as one mixer, and may be connected to the signal processor 640 by a transmission line through which the integrated signal passes. According to an embodiment of the disclosure, the signal processor 640 may detect a reflection coefficient based on the magnitude of the signal processed by the RF elements 630. According to the method of detecting the reflection coefficient by the signal processor 640, the reflection coefficient may be detected by determining a phase of the reflection coefficient and a magnitude of the reflection coefficient through the process of Equation 9 to Equation 19, based on the magnitude of the signal extracted by the above-mentioned Equation 20 to Equation 25.

Figure 7:
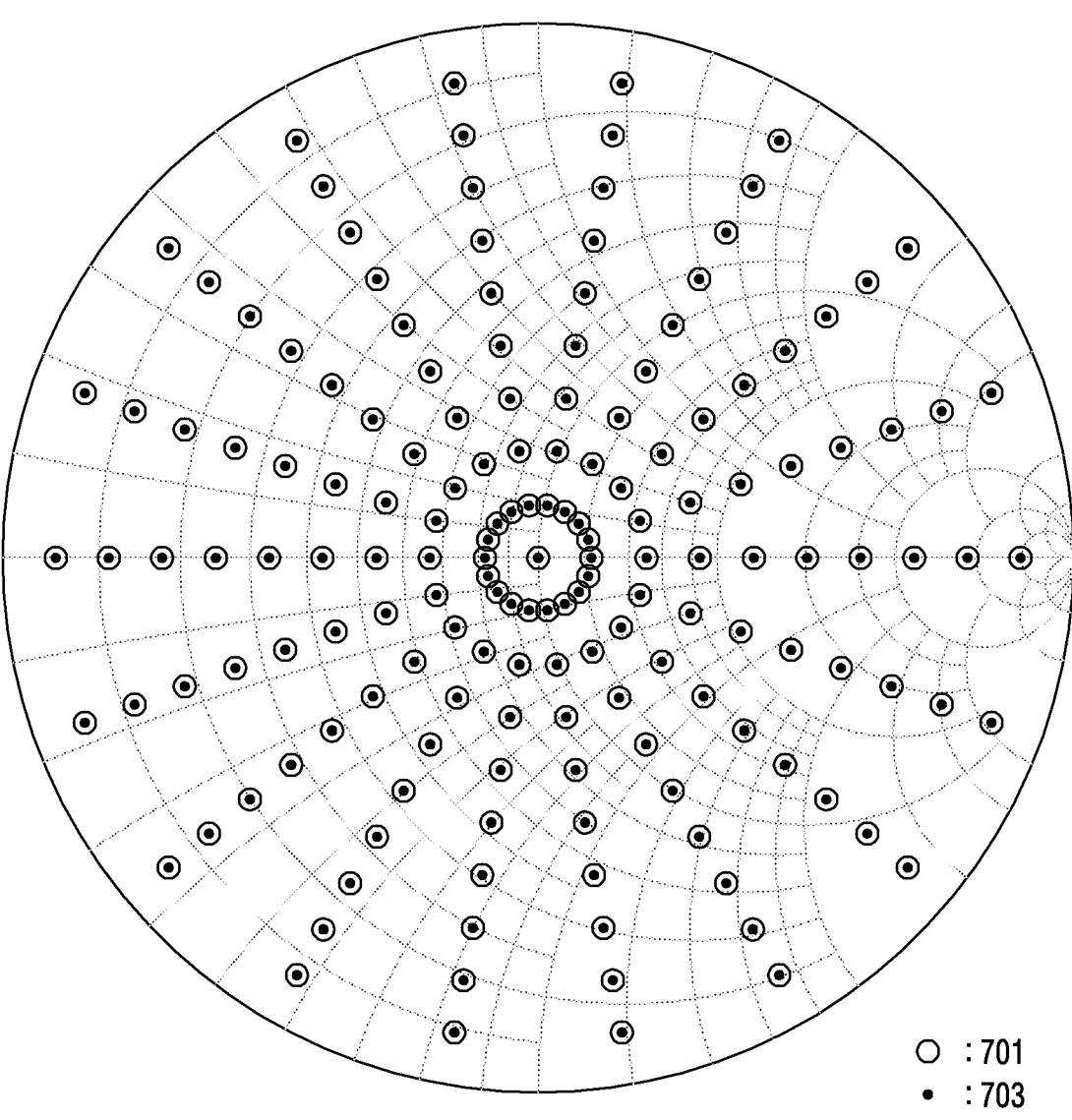
FIG. 7 illustrates a Smith chart for a reflection coefficient according to a signal according to an embodiment of the disclosure.

FIG. 7 illustrates a Smith chart for a reflection coefficient according to a signal according to an embodiment of the disclosure.

Referring to FIG. 7, a reflection coefficient which is theoretically calculated by implementing a simulation of an electronic device to which the small reflection coefficient detection circuit of FIG. 6 is connected, and a reflection coefficient calculated by the above-described equations based on the signal obtained through the small reflection coefficient detection circuit of FIG. 6 are respectively shown. Referring to FIG. 7, the range of the frequency of the signal corresponds to 0 to 30 GHz.

Referring to FIG. 7, a first graph 701 represents a reflection coefficient theoretically calculated by implementing a simulation of an electronic device to which the small reflection coefficient detection circuit of FIG. 6 is connected. A second graph 703 represents a reflection coefficient calculated by the above-described equations based on a signal acquired through the small reflection coefficient detection circuit of FIG. 6. Referring to the first graph 701 and the second graph 703, values of reflection coefficients according to each graph may be similarly formed. When the difference between the first graph 701 and the second graph 703 is compared, the root mean square error (RMSE) (unit: %) of the second graph 703 compared to the first graph 701 may be 0.1 In other words, in comparison with a method in which the reflection coefficient is theoretically calculated, a method for acquiring information (e.g., voltage) about a signal at a plurality of points (e.g., three contacts) and calculating a reflection coefficient by converting the information on the acquired signal into a magnitude, using the small reflection coefficient detection circuit according to an embodiment of the disclosure may show a low error, and thus it is possible to accurately detect the reflection coefficient.

Referring to FIGS. 1 to 7, a small reflection coefficient detection circuit according to an embodiment of the disclosure is electrically connected to a transmission line (hereinafter, referred to as a main transmission line) of an electronic device at a plurality of contacts, and thus may have a difference from the existing reflection coefficient detection circuit that additionally arranges a transmission line having a specific length (e.g., corresponding to λ/4 when the wavelength of the signal is λ). For example, the small reflection coefficient detection circuit may be electrically connected to the main transmission line at a plurality of contacts, it is possible to obtain information on a signal for a narrow area (<λ/4) compared to the prior art and measure a reflection coefficient through this information. In other words, an area in which RF components for measuring the reflection coefficient of the small reflection coefficient detection circuit according to an embodiment of the disclosure are disposed may be relatively smaller than an area in which a transmission line having a length of λ/4 is disposed. In addition, the small reflection coefficient detection circuit according to an embodiment of the disclosure may accurately detect the reflection coefficient while being disposed in a relatively small area in the electronic device (or the integrated circuit of the electronic device). Accordingly, the integrated circuits of the electronic device using the mmWave band signal may be miniaturized, and the degree of integration of the electronic device may be improved.

In addition, the small reflection coefficient detection circuit according to an embodiment of the disclosure enables efficient reflection coefficient detection, in comparison with an existing structure of additionally disposing a transmission line having a specific length and processing information obtained by the disposed transmission line. In the existing reflection coefficient detection structure including a transmission line of a specific length, phase processing is required through a detector (e.g., an in-phase quadrature (I/Q) detector) based on information on the magnitude and phase of a signal acquired from a transmission line of a specific length. On the contrary, the small reflection coefficient detection circuit according to an embodiment of the disclosure may detect the reflection coefficient based on the magnitude of the signal acquired from the coupler and the RF element and the length (e.g., electrical or physical length) between the contacts determined during design. Accordingly, in the small reflection coefficient detection circuit according to an embodiment of the disclosure, an additional detector structure may not be required. In the end, through this structure, the electronic device using the mmWave band signal as described above may be miniaturized and the degree of integration of the electronic device may be improved.

In the existing reflection coefficient detection circuit structure, a length of a transmission line additionally disposed for reflection coefficient detection may be configured by λ/4 (λ: wavelength of a signal). In contrast, the small reflection coefficient detection circuit according to an embodiment of the disclosure may require only a connection between a coupler and a main transmission line in an area smaller than or equal to ⅕ of the existing structure for reflection coefficient detection. For example, in the case of an integrated circuit of an electronic device using a signal of 28 GHz, the small reflection coefficient detection circuit according to an embodiment of the disclosure may be configured by a length of about 297 μm. Based on such high integration, the electronic device including the small reflection coefficient detection circuit according to an embodiment of the disclosure may perform a function of self-inspection or self-correction through the detected reflection coefficient. In addition, the electronic device may include a structure for performing a function of self-inspection or self-correction inside or outside the electronic device. In the end, in an apparatus including the small reflection coefficient detection circuit and a reflection coefficient detection method according to an embodiment of the disclosure, a miniaturized structure may be included inside or outside the integrated circuit so as to perform a self-correction function, and a target signal may be transmitted or received more efficiently compared to the existing structure.

Figure 8:
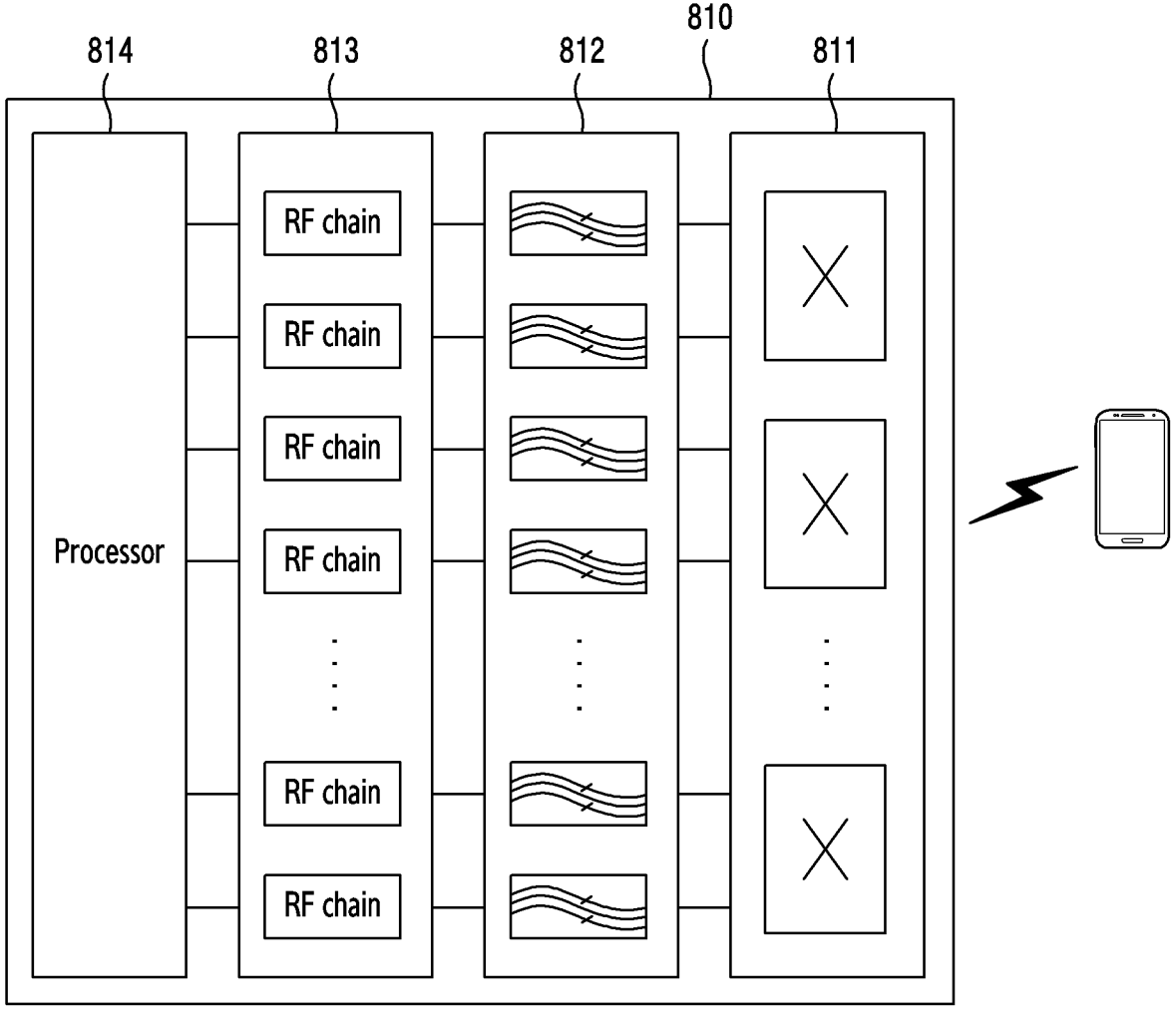
FIG. 8 illustrates a functional configuration of an electronic device according to an embodiment of the disclosure.

FIG. 8 illustrates a functional configuration of an electronic device according to an embodiment of the disclosure.

Referring to FIG. 8, a functional configuration of an electronic device 810 is illustrated. The electronic device 810 may include an antenna part 811, a filter part 812, a radio frequency (RF) processor 813, and a processor 814.

The antenna part 811 may include a plurality of antennas. The antenna performs functions for transmitting or receiving signals through a radio channel. The antenna may include a radiator including a conductor or a conductive pattern formed on a substrate (e.g., a PCB). The antenna may radiate an up-converted signal on a radio channel or acquire a signal radiated by another device. Each antenna may be referred to as an antenna element or an antenna device. In some embodiments of the disclosure, the antenna part 811 may include an antenna array (e.g., a sub array) in which a plurality of antenna elements constitute arrays. The antenna part 811 may be electrically connected to the filter part 812 through RF signal lines. The antenna part 811 may be mounted on a PCB including a plurality of antenna elements. The PCB may include a plurality of RF signal lines connecting each antenna element and a filter of the filter part 812. The RF signal lines may be referred to as a feeding network. The antenna part 811 may provide a received signal to the filter part 812 or may radiate a signal provided from the filter part 812 to air.

The antenna part 811 according to various embodiments may include at least one antenna module having a dual-polarized antenna. The dual-polarized antenna may be, for example, a cross-pole (x-pol) antenna. The dual-polarized antenna may include two antenna elements corresponding to different polarizations. For example, the dual-polarized antenna may include a first antenna element having a polarization of +45° and a second antenna element having a polarization of −45°. The polarization may be formed by other polarizations orthogonal to each other, in addition to polarizations of +45° and −45°. Each antenna element may be connected to a feeding line, and may be electrically connected to the filter part 812, the RF processor 813, and the processor 814 to be described later.

According to an embodiment of the disclosure, the dual-polarized antenna may be a patch antenna (or a microstrip antenna). Since the dual-polarized antenna has the shape of a patch antenna, an array antenna can be easily realized and integrated. Two signals having different polarizations may be input to antenna port. Each antenna port corresponds to an antenna element. For high efficiency, a relationship between co-pol characteristics and cross-pol characteristics between two signals having different polarizations may need to be improved. In the dual-polarized antenna, the co-pole characteristics indicate characteristics of a specific polarization component and the cross-pole characteristics indicate characteristics of a polarization component that is different from the specific polarization component.

The filter part 812 may perform filtering to transmit a signal of a desired frequency. The filter part 812 may perform a function for selectively identifying frequencies by forming a resonance. In some embodiments of the disclosure, the filter part 812 may form a resonance through a cavity structurally including a dielectric. In addition, in some embodiments of the disclosure, the filter part 812 may form resonance through elements that form an inductance or a capacitance. In addition, in some embodiments of the disclosure, the filter part 812 may include an elastic filter such as a bulk acoustic wave (BAW) filter or a surface acoustic wave (SAW) filter. The filter part 812 may include at least one of a band pass filter, a low pass filter, a high pass filter, and a band reject filter. For example, the filter part 812 may include RF circuits for obtaining a signal of a frequency band for transmission or a frequency band for reception. The filter part 812 according to various embodiments may electrically connect the antenna part 811 and the RF processor 813 to each other.

The RF processor 813 may include a plurality of RF paths. The RF path may refer to a unit of a path, along which a signal received through the antenna or a signal radiated through the antenna passes. At least one RF path may be referred to as an RF chain. The RF chain may include a plurality of RF elements. The RF elements may include an amplifier, a mixer, an oscillator, a DAC, an ADC, or the like. For example, the RF processor 813 may include an up converter that up-converts a digital transmission signal of a base band to a transmission frequency, and a digital-to-analog converter (DAC) that converts the up-converted digital transmission signal to an analog RF transmission signal. The up converter and the DAC may form a part of a transmission path. The transmission path may further include a power amplifier (PA) or a coupler (or a combiner). Further, for example, the RF processor 813 may include an analog-to-digital converter (ADC) that converts an analog RF reception signal to a digital reception signal, and a down converter that converts a digital reception signal to a digital reception signal of a base band. The ADC and the down converter may form a part of a reception path. The reception path may further include a low-noise amplifier (LNA) or a coupler (or a divider). RF parts of the RF processor may be realized on a PCB. The antennas and the RF parts of the RF processor may be realized on a PCB, and filters may be repeatedly coupled between the PCBs to form a plurality of layers.

The processor 814 may control overall operations of the electronic device 810. The processor 814 may include various modules for performing communication. The processor 814 may include at least one processor such as a modem. The processor 814 may include modules for digital signal processing. For example, the processor 814 may include a modem. During data transmission, the processor 814 may generate complex symbols by encoding and modulating a transmission bit array. Further, for example, during data reception, the processor 814 may restore a reception bit array through demodulation and decoding of a base band signal. The processor 814 may perform functions of a protocol stack required by communication standards.

A coupler of a small reflection coefficient detection circuit according to an embodiment of the disclosure may be connected between the antenna part 811 and the filter part 812 of FIG. 8, and be connected between the filter part 812 and the RF processor 813. However, the disclosure is not limited thereto, and the coupler of the small reflection coefficient detection circuit of the disclosure may be connected to a transmission line through which a signal to be detected passes. In addition, the ADC of the RF element of the small reflection coefficient detection circuit according to an embodiment of the disclosure may be included in the RF processor 813 of FIG. 8. However, the ADC of the RF element of the small reflection coefficient detection circuit according to an embodiment of the disclosure is not included in the RF processor 813 of FIG. 8 and may have a separate configuration. The signal processor of the small reflection coefficient detection circuit according to an embodiment of the disclosure may correspond to the processor 814 of FIG. 8.

Referring to FIG. 8, the functional configuration of the electronic device 810 as equipment to which an apparatus according to various embodiments of the disclosure may be applied has been described. However, the example shown in FIG. 8 is only an configuration of an apparatus for a structure according to various embodiments of the disclosure having been described through FIGS. 1 to 7, and embodiments of the disclosure are not limited to the components of the equipment shown in FIG. 8. Accordingly, the structure of the small reflection coefficient detection circuit itself, an electronic device including the structure, and a method for detecting a reflection coefficient by the structure may also be understood as embodiments of the disclosure.

A circuit for detecting a reflection coefficient of an electronic device in a wireless communication system according to an embodiment of the disclosure as described above may include at least one processor, a plurality of analog to digital converters (ADCs), a plurality of RF elements, and a plurality of transmission lines including a first transmission line, a second transmission line, and a third transmission line, wherein the plurality of ADCs, the plurality of RF elements, and the plurality of transmission lines are correspondingly connected to each other, respectively, the plurality of ADCs are connected to the at least one processor, the first transmission line is disposed to be spaced apart from a transmission line of the electronic device by a predetermined distance and is electrically connected at a first point of the transmission line, the second transmission line is disposed to be spaced apart from the transmission line by a predetermined distance and is electrically connected at a second point of the transmission line, the third transmission line is disposed to be spaced apart from the transmission line by a predetermined distance and is electrically connected at a third point of the transmission line, the first point may be spaced apart from the second point by a first length, and the third point may be spaced apart from the second point by a second length.

In an embodiment of the disclosure, the plurality of ADCs, the plurality of RF elements, and the plurality of transmission lines are connected to each other in a one-to-one basis.

In an embodiment of the disclosure, the first transmission line, the second transmission line and the third transmission line are electrically connected to the transmission line at the first point, the second point, and the third point by coupling, respectively.

In an embodiment of the disclosure, the plurality of couplers may further include a first resistor, a second resistor, and a third resistor, and the first transmission line, the second transmission line, and the third transmission line may be electrically connected to the transmission line at the first point, the second point, and the third point, respectively, by the first resistor, the second resistor, and the third resistor.

In an embodiment of the disclosure, the plurality of RF elements may be configured by non-linear elements.

In an embodiment of the disclosure, the non-linear element may be a diode.

In an embodiment of the disclosure, the first length may be configured to be identical to the second length.

In an embodiment of the disclosure, when a wavelength of a signal passing through the transmission line of the electronic device is λ, the sum of the first length and the second length may be less than λ/4.

In an embodiment of the disclosure, the first point, the second point, and the third point may be located between an antenna and a power amplifier of the electronic device.

In an embodiment of the disclosure, the first transmission line, the second transmission line, and the third transmission line may be configured to have the same structure with each other, the plurality of RF elements may include a first RF element, a second RF element and a third RF element, and the first RF element, the second RF element, and the third RF element may be configured to have the same structure with each other.

A method for detecting a reflection coefficient of an electronic device in a wireless communication system according to an embodiment of the disclosure described above may include obtaining, for a signal passing through a transmission line of the electronic device, voltages of the signal with respect to a plurality of points on the transmission line, extracting the magnitude of the measured voltages of the signal, and calculating a reflection coefficient of the signal based on the extracted magnitude of voltages of the signal and information on the plurality of points.

In an embodiment of the disclosure, the plurality of points correspond to a first point, a second point spaced apart from the first point by a first length, and a third point spaced apart from the second point by a second length, and the information may include the first length and the second length.

In an embodiment of the disclosure, when the wavelength of the signal is λ, a sum of the first length and the second length may be less than λ/4.

In an embodiment of the disclosure, the first length and the second length may be configured to have the same length.

In an embodiment of the disclosure, the first point, the second point, and the third point may be located between an antenna of the electronic device and a power amplifier.

A circuit for detecting a reflection coefficient of an electronic device in a wireless communication system according to an embodiment of the disclosure may include a plurality of couplers including a plurality of transmission lines electrically connected to a transmission line of the electronic device at a plurality of points, a plurality of RF elements connected to the plurality of couplers, a plurality of analog to digital converters (ADCs) connected to the plurality of RF elements, and at least one processor connected to the plurality of ADCs, wherein the at least one processor is configured to calculate a reflection coefficient of a signal passing through the transmission line of the electronic device based on the magnitude of voltages of the signal and information on the plurality of points, wherein the magnitude of the voltages of the signal is extracted by the plurality of RF elements based on voltages of the signal, obtained on the plurality of points by the plurality of couplers.

In an embodiment of the disclosure, the plurality of points correspond to a first point, a second point spaced apart from the first point by a first length, and a third point spaced apart from the second point by a second length, and the information may include the first length and the second length.

In an embodiment of the disclosure, when the wavelength of the signal is λ, a sum of the first length and the second length may be less than λ/4.

In an embodiment of the disclosure, the first length and the second length may be configured to have the same length.

In an embodiment of the disclosure, the first point, the second point, and the third point may be located between an antenna of the electronic device and a power amplifier.

The methods according to the claims of this disclosure or the embodiments described herein may be implemented in the form of hardware, software, or a combination of hardware and software.

When implemented as software, a computer-readable storage medium storing one or more programs (software modules) may be provided. The one or more programs stored on the computer-readable storage medium are configured for execution by one or more processors in the electronic device. The one or more programs include instructions that cause the electronic device to execute methods according to the claims or embodiments described herein.

Such programs (software modules, software) may be stored in a random access memory, a non-volatile memory including a flash memory, a read only memory (ROM), an electrically erasable programmable read only memory (EE-PROM), a magnetic disk, or other a non-volatile memory, (EEPROM), a magnetic disc storage device, a compact disc-ROM (CD-ROM), digital versatile discs (DVDs) or other forms of optical storage, magnetic cassette. Alternatively, it may be stored in a memory comprising a combination of any or all of these. Further, there may be multiple of each of these configuration memories.

Further, the program may be stored on an attachable storage device that is accessible via a communication network, such as the Internet, an intranet, a local area network (LAN), a wide area network (WAN), or a storage area network (SAN), or a combination thereof. Such a storage device may be accessible via an external port to a device practicing an embodiment of the disclosure. Additionally, a separate storage device on a communications network may be accessible to the device performing the embodiments of the disclosure.

In the specific embodiments of the disclosure described above, the components included in the disclosure are expressed in the singular or plural, depending on the specific embodiment presented. However, the singular or plural expression is chosen for ease of description and to suit the context presented, and the disclosure is not limited to the singular or plural components, and components expressed in the plural may be comprised in the singular, or components expressed in the singular may be comprised in the plural.

While the disclosure has been shown and described with reference to various embodiments thereof, it will be understood by those skilled in the art that various changes in form and details may be made therein without departing from the spirit and scope of the disclosure. as defined by the appended claims and their equivalents.

What is claimed is:

1. A circuit for detecting a reflection coefficient of an electronic device in a wireless communication system, the circuit comprising:
   a plurality of analog to digital converters (ADCs);
   a plurality of radio frequency (RF) elements;
   memory, comprising one or more storage media, storing instructions;
   at least one processor communicatively coupled to the plurality of ADCs, the plurality of RF elements, and the memory; and
   a plurality of transmission lines including a first transmission line, a second transmission line, and a third transmission line, wherein the plurality of ADCs, the plurality of RF elements, and the plurality of transmission lines are correspondingly connected to each other, respectively, the plurality of ADCs are connected to the at least one processor,
wherein the first transmission line is disposed to be spaced apart from a transmission line of the electronic device by a predetermined distance and is electrically connected at a first point of the transmission line,
wherein the second transmission line is disposed to be spaced apart from the transmission line by a predetermined distance and is electrically connected at a second point of the transmission line,
wherein the third transmission line is disposed to be spaced apart from the transmission line by a predetermined distance and is electrically connected at a third point of the transmission line, and
wherein the first point may be spaced apart from the second point by a first length, and the third point may be spaced apart from the second point by a second length.

2. The circuit of claim 1, wherein the plurality of ADCs, the plurality of RF elements, and the plurality of transmission lines are connected to each other in a one-to-one basis.

3. The circuit of claim 1, wherein the first transmission line, the second transmission line and the third transmission line are electrically connected to the transmission line at the first point, the second point, and the third point by coupling, respectively.

4. The circuit of claim 1, wherein the plurality of RF elements are configured by non-linear elements.

5. The circuit of claim 4, wherein each of the non-linear elements is a diode.

6. The circuit of claim 1, wherein the first length is configured to be identical to the second length.

7. The circuit of claim 1, wherein when a wavelength of a signal passing through the transmission line of the electronic device is $\lambda$, a sum of the first length and the second length is less than $\lambda/4$.

8. The circuit of claim 1, wherein the first point, the second point, and the third point are located between an antenna and a power amplifier of the electronic device.

9. The circuit of claim 1,
   wherein the first transmission line, the second transmission line, and the third transmission line are configured to have the same structure with each other,
   wherein the plurality of RF elements include a first RF element, a second RF element and a third RF element, and
   wherein the first RF element, the second RF element, and the third RF element are configured to have the same structure with each other.

10. A method for detecting a reflection coefficient of an electronic device in a wireless communication system, the method comprising:
   obtaining, for a signal passing through a transmission line of the electronic device, voltages of the signal with respect to a plurality of points on the transmission line;
   extracting the magnitude of the obtained voltages of the signal; and
   calculating a reflection coefficient of the signal based on the extracted magnitude of voltages of the signal and information on the plurality of points,
   wherein the plurality of points correspond to a first point, a second point spaced apart from the first point by a first length, and a third point spaced apart from the second point by a second length, and wherein the information comprises the first length and the second length.

11. The method of claim 10, wherein when a wavelength of the signal is $\lambda$, a sum of the first length and the second length is less than $\lambda/4$.

12. The method of claim 10, wherein the first length and the second length are configured to have the same length.

13. The method of claim 10, wherein the first point, the second point, and the third point are located between an antenna of the electronic device and a power amplifier.

14. A circuit for detecting a reflection coefficient of an electronic device in a wireless communication system, the circuit comprising:

a plurality of couplers including a plurality of transmission lines electrically connected to a transmission line of the electronic device at a plurality of points;

a plurality of radio frequency (RF) elements connected to the plurality of couplers;

a plurality of analog to digital converters (ADCs) connected to the plurality of RF elements;

memory, comprising one or more storage media, storing instructions; and at least one processor communicatively coupled to the plurality of ADCs, the plurality of RF elements, and the memory, wherein the instructions, when executed by the at least one processor individually or collectively, cause the at least one processor to:

calculate a reflection coefficient of a signal passing through the transmission line of the electronic device based on the magnitude of voltages of the signal and information on the plurality of points, and wherein the magnitude of the voltages of the signal is extracted by the plurality of RF elements based on voltages of the signal, obtained on the plurality of points by the plurality of couplers.

15. The circuit of claim 14, wherein the plurality of points includes a first point, a second point spaced apart from the first point by a first length, and a third point spaced apart from the second point by a second length, and wherein the information includes the first length and the second length.

16. The circuit of claim 15, wherein when a wavelength of the signal is $\lambda$, the sum of the first length and the second length is less than $\lambda/4$.

17. The circuit of claim 15, wherein the first length is configured to be identical to the second length.

18. The circuit of claim 15, wherein the first point, the second point, and the third point are located between an antenna and a power amplifier of the electronic device.

\* \* \* \* \*